(12) United States Patent
Asano

(10) Patent No.: US 7,197,035 B2
(45) Date of Patent: Mar. 27, 2007

(54) PACKET TRANSFER APPARATUS HAVING NETWORK ADDRESS TRANSLATION CIRCUIT WHICH ENABLES HIGH-SPEED ADDRESS TRANSLATION DURING PACKET RECEPTION PROCESSING

(75) Inventor: Kazuya Asano, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 1036 days.

(21) Appl. No.: 10/102,796

(22) Filed: Mar. 22, 2002

(65) Prior Publication Data

US 2003/0076830 A1    Apr. 24, 2003

(30) Foreign Application Priority Data

Oct. 18, 2001    (JP) .............................. 2001-320745

(51) Int. Cl.
  H04L 12/56    (2006.01)
  H04L 12/28    (2006.01)
(52) U.S. Cl. ...................................... 370/392; 370/401
(58) Field of Classification Search ................ 370/392, 370/466, 475, 401
  See application file for complete search history.

(56) References Cited

U.S. PATENT DOCUMENTS

| | | | | |
|---|---|---|---|---|
| 5,459,723 | A * | 10/1995 | Thor | 370/392 |
| 5,856,974 | A * | 1/1999 | Gervais et al. | 370/392 |
| 6,058,431 | A * | 5/2000 | Srisuresh et al. | 709/245 |
| 6,480,508 | B1 * | 11/2002 | Mwikalo et al. | 370/475 |
| 6,535,511 | B1 * | 3/2003 | Rao | 370/392 |
| 6,597,700 | B2 * | 7/2003 | Golikeri et al. | 370/401 |
| 6,892,245 | B1 * | 5/2005 | Crump et al. | 709/245 |
| 7,042,876 | B1 * | 5/2006 | Jayasenan et al. | 370/389 |
| 2003/0002496 | A1 * | 1/2003 | Beier | 370/389 |
| 2003/0067926 | A1 * | 4/2003 | Golikeri et al. | 370/401 |

FOREIGN PATENT DOCUMENTS

JP    2001-237879    8/2001

OTHER PUBLICATIONS

Japanese Office Action issued on Oct. 24, 2006 in corresponding Japanese Patent Application No. 2001-320745.
Patent Abstracts of Japan, Publication No. 08-139953, Published May 31, 1996.
Patent Abstracts of Japan, Publication No. 09-074426, Published Mar. 18, 1997.
Patent Abstracts of Japan, Publication No. 09-161488, Published Jun. 20, 1997.
Patent Abstracts of Japan, Publication No. 2000-092110, Published Mar. 31, 2000.
Patent Abstracts of Japan, Publication No. 2000-332776, Published Nov. 30, 2000.
Patent Abstracts of Japan, Publication No. 2001-111621, Published Apr. 20, 2001.

* cited by examiner

*Primary Examiner*—Wing Chan
*Assistant Examiner*—Venkatesh Haliyur
(74) *Attorney, Agent, or Firm*—Staas & Halsey LLP

(57) ABSTRACT

In a packet transfer apparatus for transferring packets between first and second networks, a translated network address is assigned to a first node in the first network and having a first private network address when the first packet from the first node is transferred to a second node in the second network, and said translated network address is stored in an address management circuit associated with said first and second network addresses. Thereafter, address translation for realizing an NAT function is performed on subsequent packets transferred between the first and second nodes, by a dedicated hardware circuit and reference to the address management circuit, while performing processing for receiving the packets.

12 Claims, 19 Drawing Sheets

| PC-ID | IP ADDRESS | MAC ADDRESS |
|---|---|---|
| 12-1 | IP. 1. A | MAC. 1. A |
| 12-2 | IP. 1. B | MAC. 1. B |
| 12-3 | IP. 1. C | MAC. 1. C |
| 14-1 | IP. 2. A | MAC. 2. A |
| 14-2 | IP. 2. B | MAC. 2 B |
| 14-3 | IP. 2. C | MAC. 2. C |
| ROUTER | Don't care | MAC. router |
| ACCESS POINT | Don't care | MAC. AP |
| 17 | IP. G. A | Don't care |
| 18 | IP. G. B | Don't care |

FIG. 3

| Entry No. | Valid/ TCP | INT-IP | EXT-IP | NAT-IP | INT-PORT | EXT-PORT | NAT-PORT | INT-MAC | EXT-MAC | INT-Dest | EXT-Dest |
|---|---|---|---|---|---|---|---|---|---|---|---|
| No. 1 | 1/1 | IP.1.A | IP.G.A | NATIP.1.A | PT.1.A | PT.G.A | NATPT.1.A | MAC.1.A | MAC.AP | Port#1 | WANport |
| No. 2 | 1/0 | IP.2.C | IP.G.B | NATIP.2.C | PT.2.C | PT.G.B | NATPT.2.C | MAC.2.C | MAC.AP | Port#2 | WANport |
| No. 3 | 0/1 | | | | | | | | | | |

FIG. 8

AVAILABLE PORT NUMBER
CORRESPONDING TO
GLOBAL IP ADDRESS #1

AVAILABLE PORT NUMBER
CORRESPONDING TO
GLOBAL IP ADDRESS #2

PACKET TRANSFER APPARATUS HAVING NETWORK ADDRESS TRANSLATION CIRCUIT WHICH ENABLES HIGH-SPEED ADDRESS TRANSLATION DURING PACKET RECEPTION PROCESSING

BACKGROUND OF THE INVENTION

1) Field of the Invention

The present invention relates to a packet transfer apparatus which performs an NAT (Network Address Translation) operation, and transfers packets between first and second networks. The present invention also relates to a method for performing an NAT operation. The present invention further relates to a semiconductor device which realizes the above packet transfer apparatus.

2) Description of the Related Art

With the wide spread use of TCP/IP networks, it is becoming difficult to assign a unique IP address to every node in the world based on the current IPv4 system, in which 32-bit addresses are used.

When a function called NAT (Network Address Translation) is used, the above problem can be solved to some extent. That is, a private IP address is assigned in advance to each node belonging to an organization, a global IP address is assigned to each node belonging to the organization only when the node accesses the Internet, and the NAT function is used for assignment of the global IP address and translation from the private IP address into the global IP address and vice versa.

FIG. 17 is a diagram illustrating an example of a system including a conventional packet transfer apparatus having an NAT function.

The system of FIG. 17 comprises a router 10, hubs 11 ad 13, personal computers 12-1 to 12-3, 14-1 to 14-3, 17, and 18, an ISP (Internet Service Provider) 15, and the Internet 16.

When the router 10 receives from one of the personal computers 12-1 to 12-3, 14-1 to 14-3 a request for access to one of the personal computers 17 and 18 connected to the Internet 16, the router 10 assigns a global IP address to the one of the personal computers 12-1 to 12-3, 14-1 to 14-3 by using the NAT function, and accesses the one of the personal computers 17 and 18 based on the global IP address.

The hub 11 interconnects the personal computers 12-1 to 12-3 and the router 10 so as to enable transfer of packets between the personal computers 12-1 to 12-3 and the router 10.

The hub 13 interconnects the personal computers 14-1 to 14-3 and the router 10 so as to enable transfer of packets between the personal computers 14-1 to 14-3 and the router 10.

Thus, the personal computers 12-1 to 12-3, 14-1 to 14-3 constitute a LAN (Local Area Network), and each of the personal computers 12-1 to 12-3, 14-1 to 14-3 has a private address which is effective within only the LAN.

The ISP 15 provides connection to the Internet 16. Specifically, the ISP 15 provides a global IP address to the router 10 so as to enable access to the Internet 16.

The Internet 16 is a global network which is realized by interconnecting computer networks such as LANs and WANs (Wide Area Networks) located at many places with dedicated lines.

The personal computers 17 and 18 behave as, for example, a WEB server, and provide various types of information in response to requests.

FIG. 18 is a diagram illustrating an example of a hardware construction of the router 10. As illustrated in FIG. 18, the router 10 comprises a Central Processing Unit (CPU) 10a, a Read-only Memory (ROM) 10b, a Random Access Memory (RAM) 10c, an Interface (I/F) 10d, and a bus 10e.

The CPU 10a controls the respective portions of the router 10 in accordance with programs stored in the ROM 10b, and performs processing of packets which are input through the interface 10d.

The ROM 10b stores programs which are executed by the CPU 10a, data, and the like.

The RAM 10c temporarily stores programs currently executed by the CPU 10a, and data which are currently processed.

The interface 10d transforms signals representing each packet input from the hub 11 or 13 or the ISP 15 so as to match with an internal protocol in the router 10, and also transforms signals representing each packet to be output to hub 11 or 13 or the ISP 15 so as to match an external protocol.

The bus 10e interconnects the CPU 10a, the ROM 10b, the RAM 10c, and the interface 10d, and enables exchange of information between the CPU 10a, the ROM 10b, the RAM 10c, and the interface 10d.

The operations of the conventional system as above are explained below.

For example, when the personal computer 12-1 sends to the router 10 a packet requesting access to the personal computer 17, the router 10 accesses the ISP 15, and receives a global IP address provided by the ISP 15. Then, the router 10 replaces a source address (the private address of the personal computer 12-1) contained in the packet sent from the personal computer 12-1 with the global IP address provided by the ISP 15, reduces a value in the TTL (Time to Live) field of the packet, recalculates values in the checksum fields of the IP header and TCP or UDP header of the packet, and transmits the packet to the Internet 16.

When the personal computer 17 receives the above packet, the personal computer 17 produces a packet containing information requested by the received packet, and transmits the produced packet to the Internet 16. At this time, the source address contained in the header of the produced packet is an IP address of the personal computer 17, and the destination address contained in the header of the produced packet is the source address of the received packet.

When the router 10 receives a packet transmitted from the personal computer 17, the router 10 replaces the destination address contained in the header of the packet transmitted from the personal computer 17 with the private address of the personal computer 12-1, reduces the value in the TTL field of the packet, recalculates the values in the checksum fields of the IP header and TCP or UDP header of the packet, and transmits the packet to the personal computer 12-1 through the hub 11.

When the personal computer 12-1 receives the packet from the router 10, the personal computer 12-1 refers to the destination address in the header of the received packet in order to determine whether or not the received packet is addressed to the personal computer 12-1. When yes is determined, the router 10 takes the packet in.

Thus, packets can be exchanged between the personal computers 12-1 and 17.

Next, the NAT processing performed in the router 10 is explained with reference to FIG. 19.

In step S10, the CPU 10a refers to a header of a packet received through the interface 10d, and determines whether or not the NAT processing is necessary. When yes is determined in step S10, the operation goes to step S11. When no is determined in step S10, the operation of FIG. 19 is completed.

In step S11, the CPU 10a translates a private address and a TCP or UDP port number which are contained in the header portion of the received packet, into a global IP address and a translated TCP or UDP port number.

In step S12, the value of the TTL field of the header portion of the received packet is reduced.

In step S13, the CPU 10a determines whether or not the reduced value of the TTL field is zero. When yes is determined in step S13, the operation goes to step S14. When no is determined in step S13, the operation goes to step S15.

In step S14, the CPU 10a determines that the lifetime of the received packet expires, and discards the received packet.

In step S15, the CPU 10a recalculates the value in the checksum field of the IP header of the packet.

In step S16, the CPU 10a recalculates the value in the checksum field of the TCP or UDP header of the packet.

In step S17, the CPU 10a replaces a MAC address of a destination in the packet.

In step S18, the CPU 10a recalculates the value of the FCS (Frame Check Sequence) in the Ethernet frame.

Thus, the NAT processing of the received packet is completed.

However, in the conventional router 10, the above processing is performed by software in accordance with programs stored in the ROM 10b. Therefore, it takes a very long time to perform the above processing.

SUMMARY OF THE INVENTION

An object of the present invention is to provide a packet transfer apparatus which can perform an NAT operation in a short time, and can be produced at low cost.

An object of the present invention is to provide a packet transfer method which can perform an NAT operation in a short time, and can be executed by using an inexpensive packet transfer apparatus.

(I) According to the first aspect of the present invention, there is provided a packet transfer apparatus for transferring packets between first and second networks. The packet transfer apparatus comprises: an address assignment circuit which assigns a translated network address to a first node belonging to the first network and having a first network address when the packet transfer apparatus transfers a first packet from the first node to a second node belonging to the second network and having a second network address through a connection; an address management circuit which stores for the connection the translated network address, associated with the first and second network addresses; and an address translation circuit which is realized by a dedicated hardware circuit, and translates the first network address contained in a second packet into the translated network address by reference to the address management circuit when the packet transfer apparatus transfers the second packet from the first node to the second node through the connection, and translates the translated network address contained in a third packet into the first network address by reference to the address management circuit when the packet transfer apparatus transfers the third packet from the second node to the first node through the connection.

Thus, the packet transfer apparatus according to the first aspect of the present invention can perform NAT processing in a short time, and can be produced at low cost.

The packet transfer apparatus according to the first aspect of the present invention may also have one or any possible combination of the following additional features (1) to (9).

(1) The address translation circuit may separately store a combination of the translated network address and the first and second network addresses for each port number defined in the second network so that an identical translated network address can be assigned to more than one node in the first network.

(2) The packet transfer apparatus according to the first aspect of the present invention may further comprise a start-of-communication detection circuit which detects a start of communication through a connection, and when the start-of-communication detection circuit detects a start of communication through a connection, information on the connection is registered in the address management circuit.

(3) The packet transfer apparatus according to the first aspect of the present invention may further comprise a termination-of-communication detection circuit which detects termination of communication through a connection, and when the termination-of-communication detection circuit detects termination of communication through a connection, information on the connection registered in the address management circuit is deleted.

(4) The address management circuit may store at least one reference information item on at least one connection, and each of the at least one reference information item includes a combination of a network address of a node belonging to the first network, a network address of a node belonging to the second network, and a translated network address. In this case, the address translation circuit reads in parallel the at least one reference information item from the address management circuit, compares a first predetermined portion of a fourth packet with the at least one reference information item in parallel in order to search for one of the at least one reference information item which matches with the first predetermined portion of the fourth packet, and translates a third network address of a third node belonging to the first network, contained in the fourth packet, into the translated network address included in the one of the at least one reference information item when the fourth packet is transferred from the first network to the second network, or translates a translated network address contained in the fourth packet into the network address of the node belonging to the first network, included in the one of the at least one reference information item, when the fourth packet is transferred from the second network to the first network.

(5) The address translation circuit may comprise a multiplexer and a counter, and the address translation circuit translates the first network address into the translated network address, and the translated network address into the first network address, in the multiplexer by reference to a count value of the counter.

(6) The packet transfer apparatus according to the first aspect of the present invention may further comprise a checksum calculation circuit which calculates at least one checksum of each of the second and third packets after the address translation circuit translates the first network address into the translated network address or the translated network address into the first network address.

(7) The checksum calculation circuit may comprise a multiplexer and a counter, and the checksum calculation circuit inserts the at least one checksum in at least one appropriate portion of each packet by using the multiplexer by reference to a count value of the counter.

(8) The at least one checksum may include a TCP or UDP checksum, and the checksum calculation circuit calculates the TCP or UDP checksum by using data of each packet before and after translation by the address translation circuit.

(9) The packet transfer apparatus according to the first aspect of the present invention may further comprise a software processing unit which realizes an NAT function by software when the address management circuit has no space for storing the translated network address.

(II) According to the second aspect of the present invention, there is provided a communication system comprising: a first network; a second network; and a packet transfer apparatus for transferring packets between first and second networks. The packet transfer apparatus comprises an address assignment circuit which assigns a translated network address to a first node belonging to the first network and having a first network address when the packet transfer apparatus transfers a first packet from the first node to a second node belonging to the second network and having a second network address through a connection, an address management circuit which stores for the connection the translated network address, associated with the first and second network addresses, and an address translation circuit which is realized by a dedicated hardware circuit, and translates the first network address contained in a second packet into the translated network address by reference to the address management circuit when the packet transfer apparatus transfers the second packet from the first node to the second node through the connection, and translates the translated network address contained in a third packet into the first network address by reference to the address management circuit when the packet transfer apparatus transfers the third packet from the second node to the first node through the connection.

The communication system according to the second aspect of the present invention includes the packet transfer apparatus according to the first aspect of the present invention. Therefore, it is possible to construct a communication system having a high-performance NAT processing at low cost.

(III) According to the third aspect of the present invention, there is provided a method for transferring packets between first and second networks. The method comprises the steps of: (a) assigning a translated network address to a first node belonging to the first network and having a first network address when the packet transfer apparatus transfers a first packet from the first node to a second node belonging to the second network and having a second network address through a connection; (b) storing for the connection the translated network address, associated with the first and second network addresses in an address management circuit; and (c) translating, by a dedicated hardware circuit, the first network address contained in a second packet into the translated network address by reference to the address management circuit when the packet transfer apparatus transfers the second packet from the first node to the second node through the connection; and translating, by a dedicated hardware circuit, the translated network address contained in a third packet into the first network address by reference to the address management circuit when the packet transfer apparatus transfers the third packet from the second node to the first node through the connection.

According to the third aspect of the present invention, an NAT operation can be performed in a short time by using an inexpensive packet transfer apparatus.

(IV) According to the fourth aspect of the present invention, there is provided a semiconductor device for use in a packet transfer apparatus which transfers packets between first and second networks. The semiconductor device comprises: an address assignment circuit which assigns a translated network address to a first node belonging to the first network and having a first network address when the packet transfer apparatus transfers a first packet from the first node to a second node belonging to the second network and having a second network address through a connection; an address management circuit which stores for the connection the translated network address, associated with the first and second network addresses; and an address translation circuit which is realized by a dedicated hardware circuit, and translates the first network address contained in a second packet into the translated network address by reference to the address management circuit when the packet transfer apparatus transfers the second packet from the first node to the second node through the connection, and translates the translated network address contained in a third packet into the first network address by reference to the address management circuit when the packet transfer apparatus transfers the third packet from the second node to the first node through the connection.

Thus, when the semiconductor device according to the fourth aspect of the present invention is used, it is possible to realize an inexpensive, high-performance packet transfer apparatus which can perform NAT processing in a short time.

The semiconductor device according to the fourth aspect of the present invention may also have one or any possible combination of the aforementioned additional features (1) to (9).

(V) According to the fifth aspect of the present invention, there is provided a method for transferring a packet between first and second networks. The method comprises the steps of: (a) receiving each portion of a packet transmitted from a first node and addressed to a second node, where the first node belongs to the first network and has a first network address, and the second node belongs to the second network and has a second network address; (b) reading in parallel at least one portion of at least one reference information item from an address management circuit while acquiring the received portion of the packet, where each of the at least one reference information item includes a combination of a network address of a node belonging to the first network, a network address of a node belonging to the second network, and a translated network address, and the at least one portion of the at least one reference information item corresponds to the received portion of the packet; (c) comparing the received portion of the packet with the at least one portion of at least one reference information item in parallel, by a first dedicated hardware circuit, while receiving a portion of the packet subsequent to the compared portion of the packet; (d) determining one of the at least one reference information item which matches with the packet based on a result of the operation in step (c); and (e) translating the first network address contained in the packet, into the translated network address included in the one of the at least one reference information item, or the translated network address contained in the packet, into the first network address included in the one of the at least one reference information item, by a second dedicated hardware circuit.

According to the fifth aspect of the present invention, an NAT operation can be performed in a short time by using an inexpensive packet transfer apparatus.

(VI) According to the sixth aspect of the present invention, there is provided a packet transfer apparatus for transferring a packet between first and second networks. The packet transfer apparatus comprises: a packet receiving circuit which receives each portion of a packet transmitted from a first node and addressed to a second node, where the first node belongs to the first network and has a first network address, and the second node belongs to the second network and has a second network address; an address management circuit which stores at least one reference information item, where each of the at least one reference information item includes a combination of a network address of a node belonging to the first network, a network address of a node belonging to the second network, and a translated network address, and the at least one portion of the at least one reference information item corresponds to the received portion of the packet; a reading control circuit which controls the address management circuit so as to output in parallel at least one portion of at least one reference information item; a packet data acquisition circuit which acquires the received portion of the packet, and supplies the received portion of the packet to a comparison circuit in synchronization with the at least one portion of at least one reference information item output from the address management circuit; the comparison circuit which is realized by a first dedicated hardware circuit, and compares the received portion of the packet with the at least one portion of at least one reference information item in parallel, and determines one of the at least one reference information item which matches with the packet; and an address translation circuit which is realized by a second dedicated hardware circuit, and translates the first network address contained in the packet, into the translated network address included in the one of the at least one reference information item, or the translated network address contained in the packet, into the first network address included in the one of the at least one reference information item.

Thus, the packet transfer apparatus according to the sixth aspect of the present invention can perform NAT processing in a short time, and can be produced at low cost.

The above and other objects, features and advantages of the present invention will become apparent from the following description when taken in conjunction with the accompanying drawings which illustrate preferred embodiment of the present invention by way of example.

BRIEF DESCRIPTION OF THE DRAWINGS

In the drawings:

FIG. 3 is a diagram illustrating examples of ID, IP addresses and MAC addresses assigned to the respective elements in the communication system of FIG. 2;

FIG. 8 is a diagram illustrating examples of contents of the reference data items registered in the memory 52;

DESCRIPTION OF THE PREFERRED EMBODIMENTS

Embodiments of the present invention are explained in detail below with reference to drawings.

(1) Basic Construction

Figure 1:
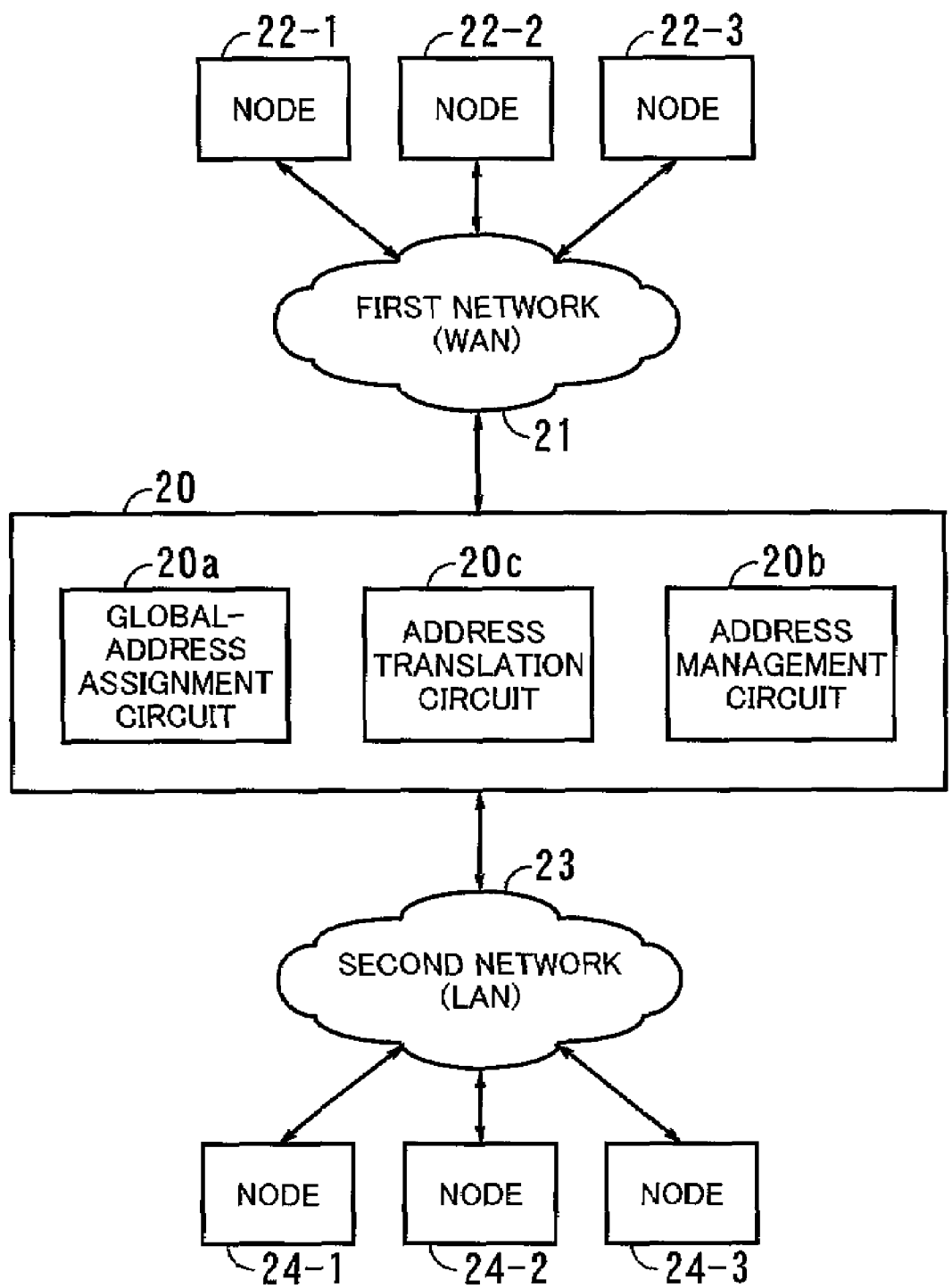
FIG. 1 is a diagram illustrating a basic construction of the communication system according to the present invention.

FIG. 1 is a diagram illustrating a basic construction of the communication system according to the present invention. The communication system of FIG. 1 comprises first and second networks 21 and 23 which are connected through a packet transfer apparatus 20. In addition, a plurality of nodes (e.g., nodes 22-1 to 22-3) are connected to the first network 21, and a plurality of nodes (e.g., nodes 24-1 to 24-3) are connected to the second network 23.

The packet transfer apparatus 20 comprises a global-address assignment circuit 20a, an address management circuit 20b, and an address translation circuit 20c.

When the packet transfer apparatus 20 receives a packet addressed to one of the plurality of nodes 22-1 to 22-3 connected to the first network 21, from one of the plurality of nodes 24-1 to 24-3 connected to the second network 23, the global-address assignment circuit 20a assigns a global network address to the one of the plurality of nodes 24-1 to 24-3 connected to the second network 23.

When a global network address is assigned by the global-address assignment circuit 20a to the one of the plurality of nodes 24-1 to 24-3 connected to the second network 23, corresponding to reception of a packet addressed to one of the plurality of nodes 22-1 to 22-3 connected to the first network 21, from one of the plurality of nodes 24-1 to 24-3 connected to the second network 23, the address management circuit 20b stores the global network address assigned to the one of the plurality of nodes 24-1 to 24-3, associated with the combination of the destination network address of the one of the plurality of nodes 22-1 to 22-3 connected to the first network 21 and the private network address of the one of the plurality of nodes 24-1 to 24-3 connected to the second network 23.

The address translation circuit 20*c* refers to the address management circuit 20*b*, and translates a global network address of a first one of the plurality of nodes 24-1 to 24-3 connected to the second network 23, which is contained in a header of a packet, into a private network address of the first one of the plurality of nodes 24-1 to 24-3, or translates a private network address of a second one of the plurality of nodes 24-1 to 24-3 connected to the second network 23, which is contained in a header of a packet, into a global network address of the second one of the plurality of nodes 24-1 to 24-3, according to the circumstances.

The comparison of addresses contained in a packet with addresses stored in the address management circuit 20*b* is made by hardware. In addition, the comparison can be made by parallel processing. Therefore, even when the combination of addresses in a packet are compared with more than one combination of addresses stored in the address management circuit 20*b*, the processing for the comparison can be performed in a short time.

Further, the address translation circuit 20*c* is also realized by hardware.

The first network 21 enables transfer of packets between the plurality of nodes 22-1 to 22-3 and between the plurality of nodes 22-1 to 22-3 and the second network 23 through the packet transfer apparatus 20. For example, the first network 21 can be realized as a WAN or the like.

The second network 23 enables transfer of packets between the plurality of nodes 24-1 to 24-3 and between the plurality of nodes 24-1 to 24-3 and the first network 21 through the packet transfer apparatus 20. For example, the second network 23 can be realized as a LAN or the like.

When each of the plurality of nodes 22-1 to 22-3 connected to the first network 21 receives a request for information from one of the plurality of nodes 24-1 to 24-3, the node connected to the first network 21 provides the requested information to the node connected to the second network 23. For example, each of the plurality of nodes 22-1 to 22-3 can be realized by a personal computer or the like.

The operations of the communication system of FIG. 1 are explained below.

For example, when the node 24-1 transmits a packet for requesting access to the node 22-1, the packet is received by the packet transfer apparatus 20. Then, the packet transfer apparatus 20 recognizes that the destination address of the packet is the address of the node 22-1, and the global-address assignment circuit 20*a* assigns to the node 24-1 a global network address for S use in the first network 21.

At this time, the address management circuit 20*b* stores the global network address assigned by the global-address assignment circuit 20*a* to the node 24-1, associated with the combination of the global network address of the node 22-1 and the private network address of the node 24-1, for example, in a table.

When a packet addressed to the node 22-1 is transmitted from the node 24-1 to the packet transfer apparatus 20 after the global network address of the node 24-1 is stored as above, the combination of the source address and the destination address contained in the packet coincides with the combination of the global network address of the node 22-1 and the private network address of the node 24-1 stored in the address management circuit 20*b*. Therefore, the address translation circuit 20*c* can translate the private network address of the node 24-1 contained in the packet, into the global network address assigned to the node 24-1. At this time, the address translation circuit 20*c* performs the processing by hardware. Therefore, it is possible to make the address comparison and translation in a short time.

That is, in the above example, the header of the packet addressed to the node 22-1 and transmitted from the node 24-1 to the packet transfer apparatus 20 contains the private network address of the node 24-1 as a source address and the global network address of the node 22-1 as a destination address, and therefore the combination of the source address and the destination address of the packet coincides with the combination of the private network address of the node 24-1 and the global network address of the node 22-1 stored in the address management circuit 20*b*. Thus, the address translation circuit 20*c* translates the private network address of the node 24-1 contained in the packet, into the global network address of the node 24-1 (which is assigned to the node 24-1 by the global-address assignment circuit 20*a* and stored in the address management circuit 20*b*), and transmits the packet to the first network 21. At this time, the address translation is made by hardware. Therefore, the processing for the address translation can be performed in a short time. After the address translation, the packet is transmitted through the first network 21 to the node 22-1.

When the node 22-1 receives the above packet transmitted from the packet transfer apparatus 20, the node 22-1 takes the packet in since the destination address of the packet is the network address of the node 22-1. Then, the node 22-1 performs information processing requested by the received packet, produces a packet containing data as a result of the information processing, and transmits the produced packet to the first network 21. At this time, the node 22-1 inserts into the produced packet the global network address of the node 22-1 as a source address and the source address of the received packet (i.e., the global network address assigned to the node 24-1 by the global-address assignment circuit 20*a*) as a destination address.

When the packet transfer apparatus 20 receives the packet transmitted from the node 22-1, the packet transfer apparatus 20 compares the addresses contained in the header of the received packet, with the addresses stored in the address management circuit 20*b*, and determines whether or not address translation is to be made.

In this example, the source address of the packet transmitted from the node 22-1 is the global network address of the node 22-1, the destination address of the packet is the global network address assigned to the node 24-1, and the combination of these addresses are held (registered) by the address management circuit 20*b*. Therefore, the destination address of the packet is translated into the private network address of the node 24-1. After the address translation, the packet is transmitted to the node 24-1 through the second network 23.

When the node 24-1 receives the above packet transmitted from the packet transfer apparatus 20, the node 24-1 recognizes that the packet is addressed to the node 24-1, and takes the packet in.

Thereafter, when the packet transfer apparatus 20 receives from the node 24-1 a packet addressed to the node 22-1, the address translation circuit 20*c* in the packet transfer apparatus 20 refers to the address management circuit 20*b*, and translates the private network address of the node 24-1, which is contained in the packet, into the global network address of the node 24-1. In addition, when the packet transfer apparatus 20 receives from the node 22-1 a packet addressed to the node 24-1, the address translation circuit 20*c* in the packet transfer apparatus 20 refers to the address management circuit 20*b*, and translates the global network address of the node 24-1, which is contained in the packet, into the private network address of the node 24-1.

Consequently, the node 24-1 can exchange packets with the node 22-1 as if the node 24-1 had the global network address.

As explained above, according to the present invention, the NAT processing can be performed by the address management circuit 20b and the address translation circuit 20c, both of which is realized by hardware. Therefore, the NAT processing can be performed in a short time.

In addition, the global-address assignment circuit 20a can also be realized by hardware.

(2) Construction of Embodiment

Figure 2:
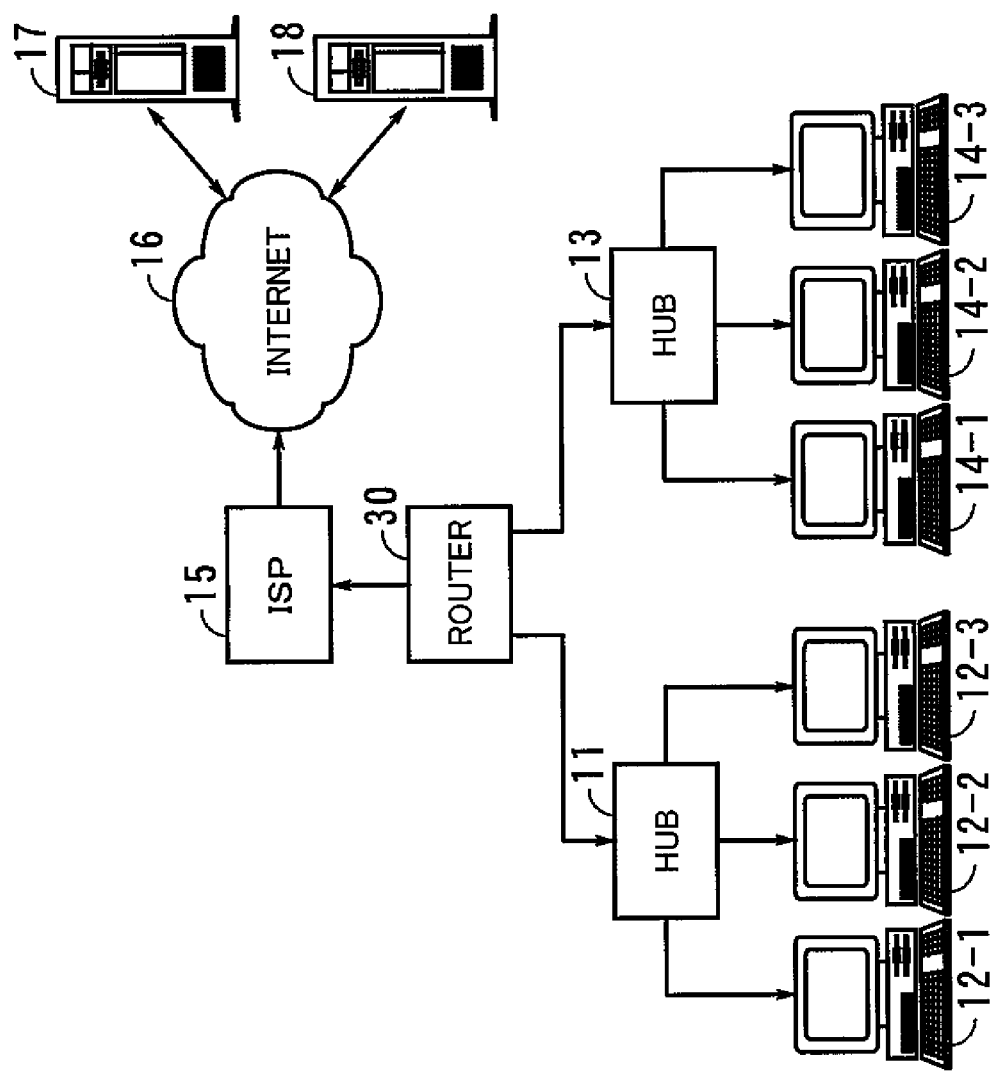
FIG. 2 is a diagram illustrating an example of a configuration including a router 30 which realizes a packet transfer apparatus as an embodiment of the present invention.

FIG. 2 is a diagram illustrating an example of a configuration including a router 30 which realizes a packet transfer apparatus as an embodiment of the present invention.

Figure 17:
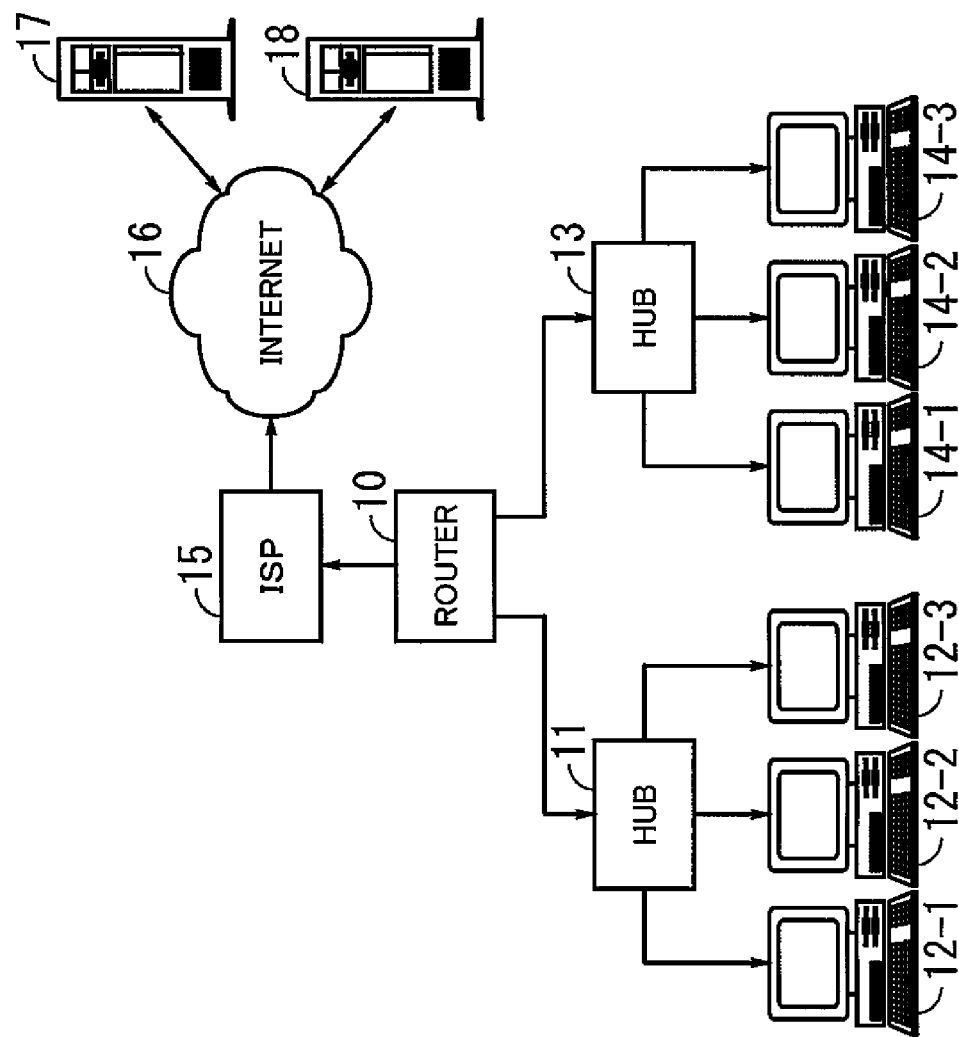
FIG. 17 is a diagram illustrating an example of a system including a conventional packet transfer apparatus having an NAT function.
Figure 18:
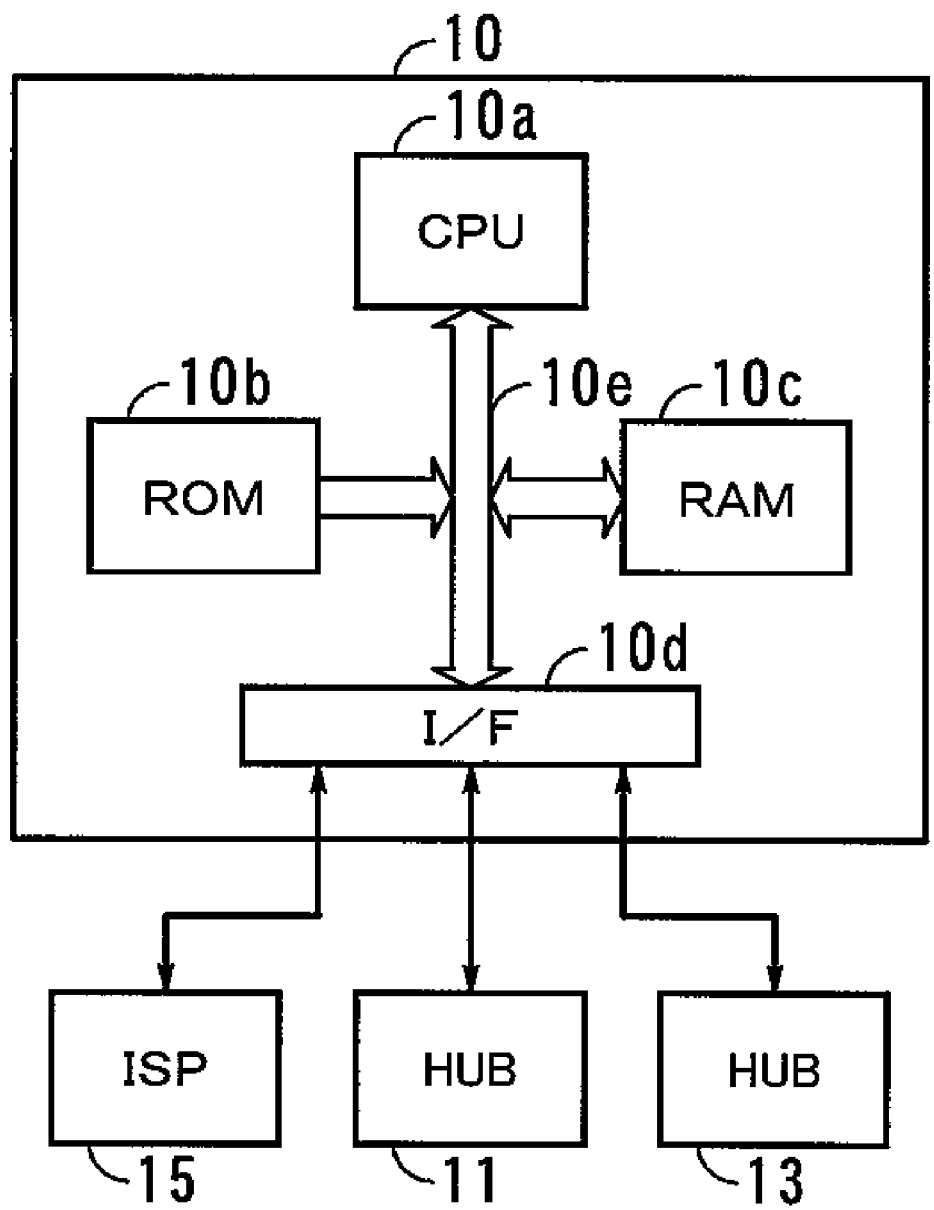
FIG. 18 is a diagram illustrating an example of a hardware construction of the router 10.
Figure 19:
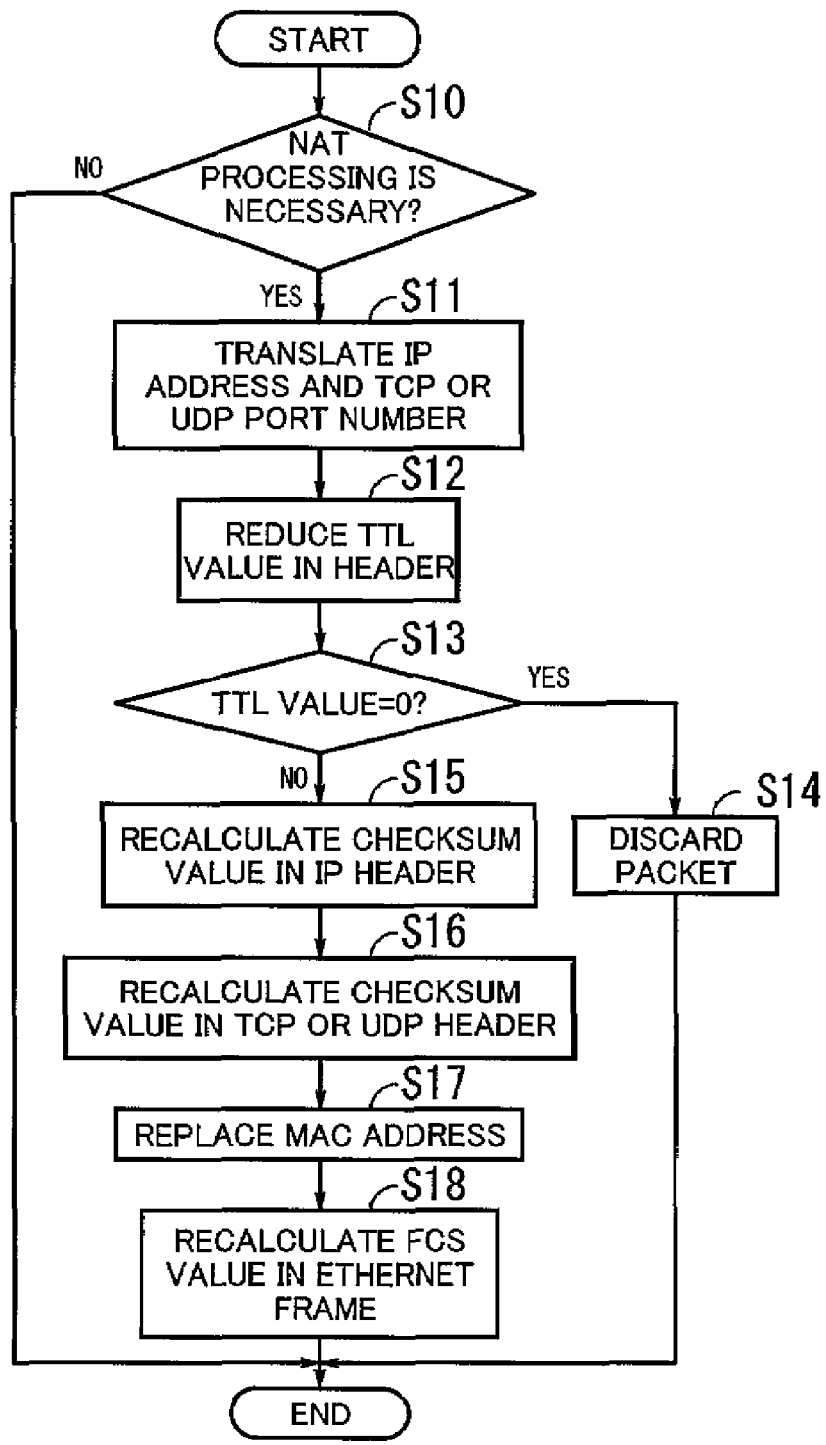
FIG. 19 is a flow diagram indicating a sequence of operations performed by the router 10 for the NAT processing.

The communication system of FIG. 2 has the same configuration as that of FIG. 17 except that the router 30 is provided instead of the router 10. Therefore, the explanations on the same elements as FIG. 17 are not repeated below.

That is, the personal computers 12-1 to 12-3, 14-1 to 14-3, the hubs 11 and 13, the ISP 15, the Internet 16, the personal computers 17 and 18 have the functions explained with reference to FIG. 17.

The router 30 has ports #1, #2, and #3, which are respectively connected to the hubs 11 and 13 and ISP 15. When the router 30 receives from one of the personal computers 12-1 to 12-3, 14-1 to 14-3 a request for access to one of the personal computers 17 and 18 connected to the Internet 16, the router 30 assigns a global IP address to the one of the personal computers 12-1 to 12-3, 14-1 to 14-3 by using the NAT function, and accesses the one of the personal computers 17 and 18 based on the global IP address.

FIG. 3 is a diagram illustrating examples of IP addresses and MAC addresses assigned to the respective elements in the communication system of FIG. 2. As illustrated in FIG. 3, for example, the personal computer 12-1 has a PC-ID "12-1", an IP address "IP.1.A" and a MAC address "MAC.1.A". In FIG. 3, addresses which have no relation with the present invention are indicated as "Don't care".

Figure 4:
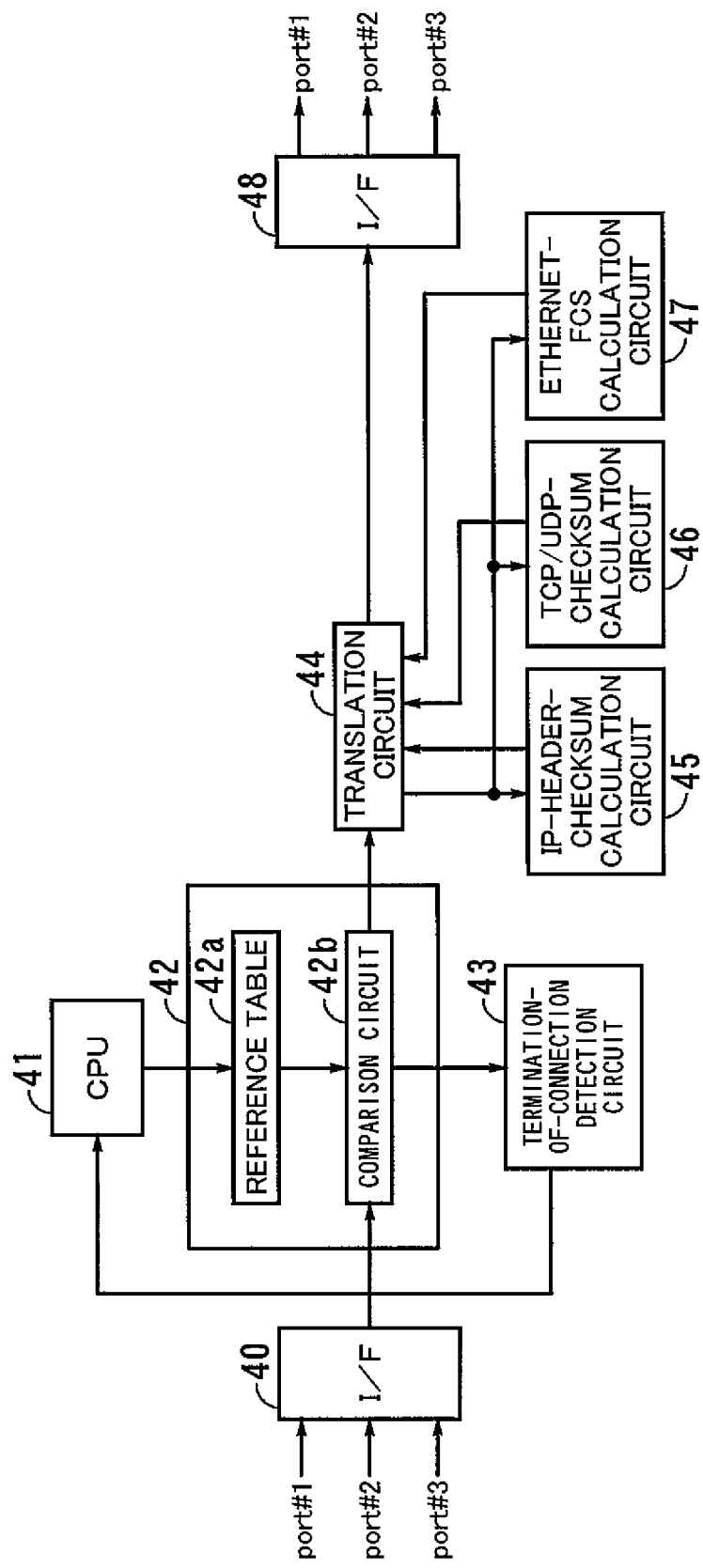
FIG. 4 is a diagram illustrating an example of a construction of the router 30.

FIG. 4 is a diagram illustrating an example of a construction of the router 30. The router 30 of FIG. 4 comprises an interface (I/F) 40, a CPU 41, a reference and comparison circuit 42, a termination-of-connection detection circuit 43, a translation circuit 44, an IP-header-checksum calculation circuit 45, a TCP/UDP-checksum calculation circuit 46, an Ethernet-FCS calculation circuit 47, and interface (I/F) 48.

The interface 40 transforms signals representing each packet which is input through the port #1, #2, or #3.

The reference and comparison circuit 42 comprises a reference table 42a and a comparison circuit 42b. The comparison circuit 42b compares object data contained in a header of each packet which is input through the interface 40, with at least one reference data item registered in the reference table 42a. When the object data contained in the header coincides with one of the at least one reference data item registered in the reference table 42a, the comparison circuit 42b outputs to the translation circuit 44 the result of the comparison and translation information which is registered in the reference table 42a and associated with the one of the at least one reference data item. Details of the translation information are explained later.

In the reference table 42a, data of at least one IP address and at least one TCP or UDP port number before translation by the NAT function and at least one IP address and at least one TCP or UDP port number after the translation by the NAT function are registered. The data may be registered in advance of communication, or dynamically registered and deleted according to the circumstances of communication. The NAT operation using the data registered in advance of communication is called a static NAT operation, and the NAT operation using the data dynamically registered and deleted is called a dynamic NAT operation.

In the case where the data are dynamically registered and deleted, the first packet in communication through each connection (between a specific pair of personal computers), which is transmitted from one of the personal computers 12-1 to 12-3 and 14-1 to 14-3 to the router 30, may be processed by the CPU 41 (i.e., software), and the CPU 41 may register in the reference table 42a data including IP addresses and TCP or UDP port numbers before and after the NAT operation based on the circumstances of communication. Thereafter, the following packets in the connection may be processed by hardware.

Alternatively, IP addresses and TCP or UDP port numbers which can be used by hardware may be pooled in advance in registers. In this case, it is possible to acquire an appropriate one of the pooled IP addresses and an appropriate one of the pooled TCP or UDP port numbers from the registers (pools), and register the acquired IP address and TCP or UDP port number in the reference table 42a, when the router 30 receives through each connection each packet transmitted from one of the personal computers 12-1 to 12-3 and 14-1 to 14-3 to the router 30. In addition, data for each connection may be dynamically deleted from the reference table 42a by monitoring termination of the connection or time-out expiration.

The data to be registered in the reference table 42a may include a MAC address after the NAT operation, an output interface after the NAT operation (i.e., routing information), and other information relating to packet processing, as well as the IP addresses and TCP or UDP port numbers. In the example explained below, the MAC address after the NAT operation and the output interface after the NAT operation are included.

The comparison circuit 42b extracts IP addresses and a TCP or UDP port number from each packet which is input through the interface 40, and compares the extracted IP addresses and TCP or UDP port number with the reference data items registered in the reference table 42a. When the extracted IP addresses and TCP or UDP port number match with one of the reference data items registered in the reference table 42a, the result of the comparison and translation information which is registered in the reference table 42a and associated with the one of the reference data items are output to the translation circuit 44. The translation information output to the translation circuit 44 includes an IP address after the NAT operation, a TCP or UDP port number after the NAT operation, and a MAC address after the NAT operation.

The termination-of-connection detection circuit 43 monitors the FIN flag and the RST flag in the TCP header. When packets in which the FIN flag is set have passed through the router 30 in both directions through a connection or when a packet in which the RST flag is set has passed through the router 30 in at least one direction through the connection, the termination-of-connection detection circuit 43 determines that the connection is terminated, and notifies the CPU 41 of the termination of the connection, for example, by outputting a termination-of-connection detection signal to the CPU 41.

The translation circuit 44 translates an IP address, a TCP or UDP port number, and a MAC address based on the translation information output from the comparison circuit 42b. In addition, the translation circuit 44 reduces a value of the TTL field of the IP header. When the reduced value of the TTL field becomes "0", the transmission circuit 44 determines that the lifetime of the received packet expires, and discards the received packet.

The IP-header-checksum calculation circuit 45 calculates a value of the checksum field of the IP header of each packet after the IP address is translated, and the translation circuit 44 replaces the value of the checksum field in the IP header with the output of the IP-header-checksum calculation circuit 45.

The TCP/UDP-checksum calculation circuit 46 calculates a value of the checksum field of the TCP or UDP header of each packet after the TCP or UDP port number is translated, and the translation circuit 44 replaces the value of the checksum field in the TCP or UDP header with the output of the TCP/UDP-checksum calculation circuit 46.

The Ethernet-FCS calculation circuit 47 calculates a value of the FCS field in the Ethernet frame after the IP address, the TCP or UDP port number, the MAC address, and the values of the checksum fields in the IP header and the TCP or UDP header are replaced, and the translation circuit 44 replaces the value of the FCS field with the output of the Ethernet-FCS calculation circuit 47.

When the translation of the packet by the translation circuit 44 is completed, the packet is output through the interface 48, which appropriately transforms signals representing each packet output from the translation circuit 44, and outputs the transformed signals through an appropriate port.

When the extracted IP addresses and TCP or UDP port number coincide with none of the reference data items registered in the reference table 42a, no translation is made. Further, the packet which no translation is made is processed by the CPU 41.

Figure 5:
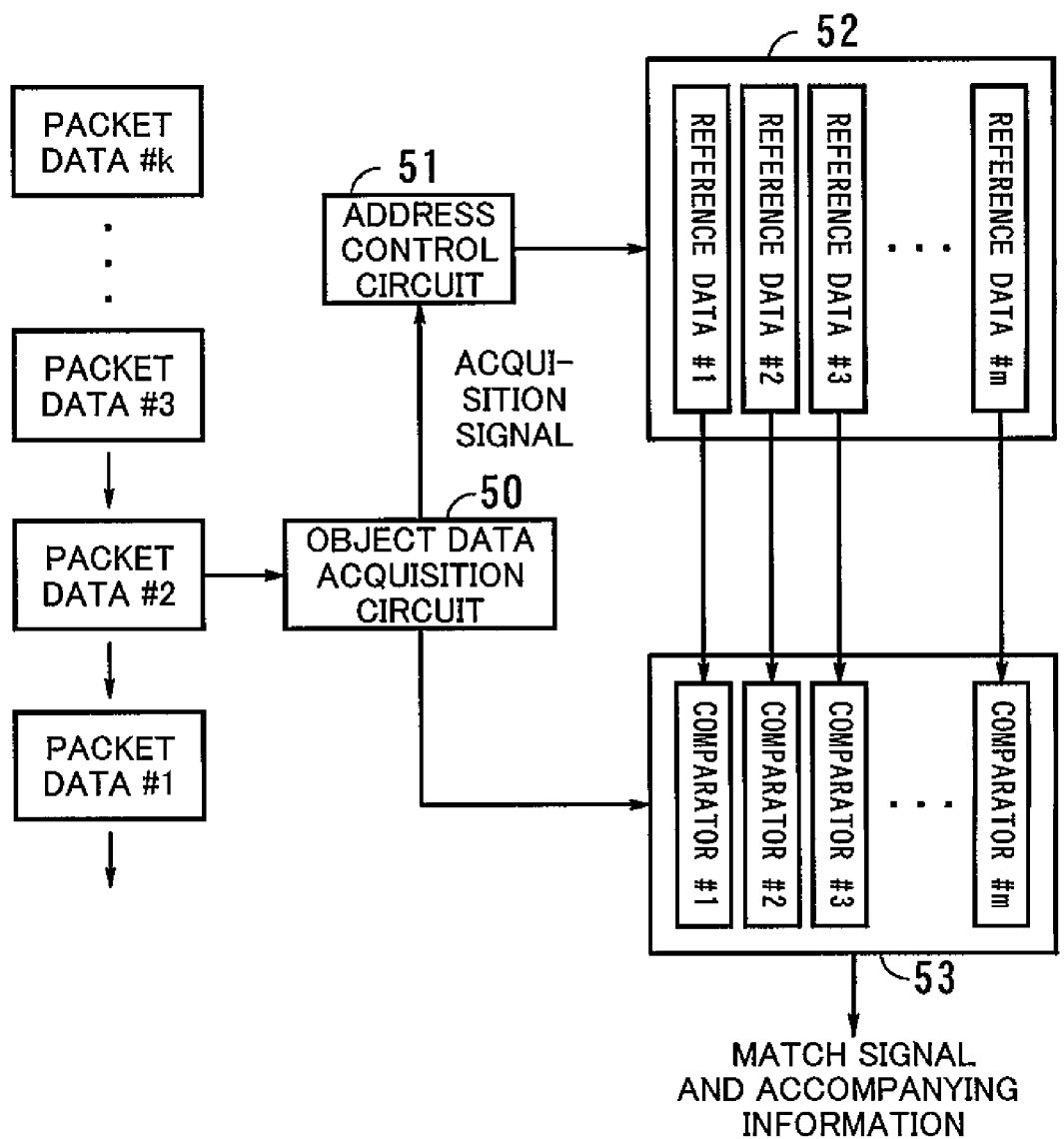
FIG. 5 is a diagram illustrating an example of a construction of the reference and comparison circuit 42.

FIG. 5 is a diagram illustrating an example of a construction of the reference and comparison circuit 42. In the example of FIG. 5, the CAM (Content Addressable Memory) is not used, and a normal memory is used. As illustrated in FIG. 5, the reference and comparison circuit 42 comprises an object data acquisition circuit 50, an address control circuit 51, a memory 52, and a comparison unit 53.

The object data acquisition circuit 50 monitors data in each packet by using a counter, acquires necessary object data by reference to the counter value, and outputs the acquired data to the comparison unit 53. The object data is comprised of at least one unit data element each having a unit data length, which corresponds to, for example, the width of a packet data bus. Every time the object data acquisition circuit 50 acquires a necessary unit data element, the object data acquisition circuit 50 sends an acquisition signal to the address control circuit 51.

Figure 6:
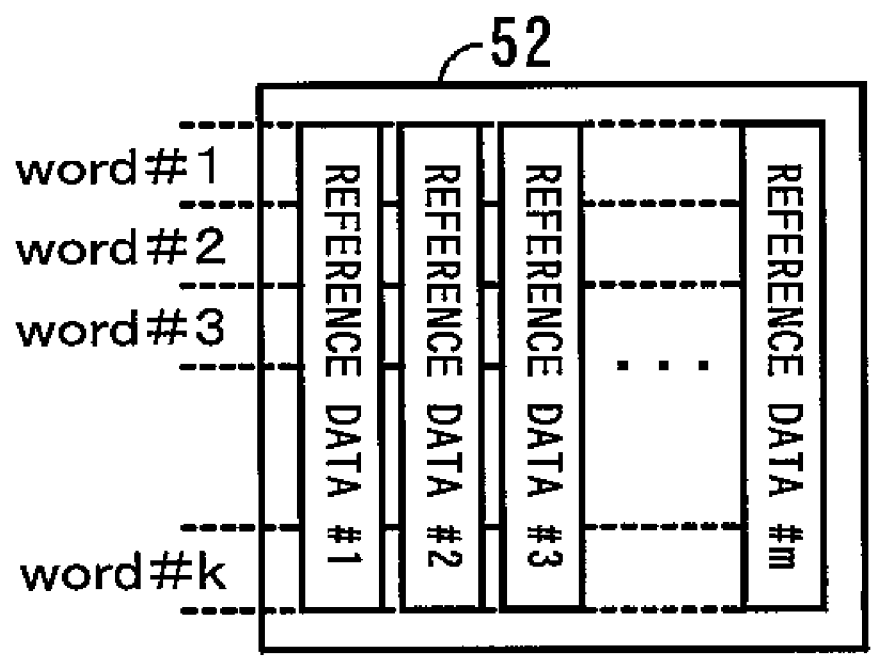
FIG. 6 is a diagram illustrating an example of an arrangement of a plurality of reference data items #1 to #m in the memory 52.
Figure 7:
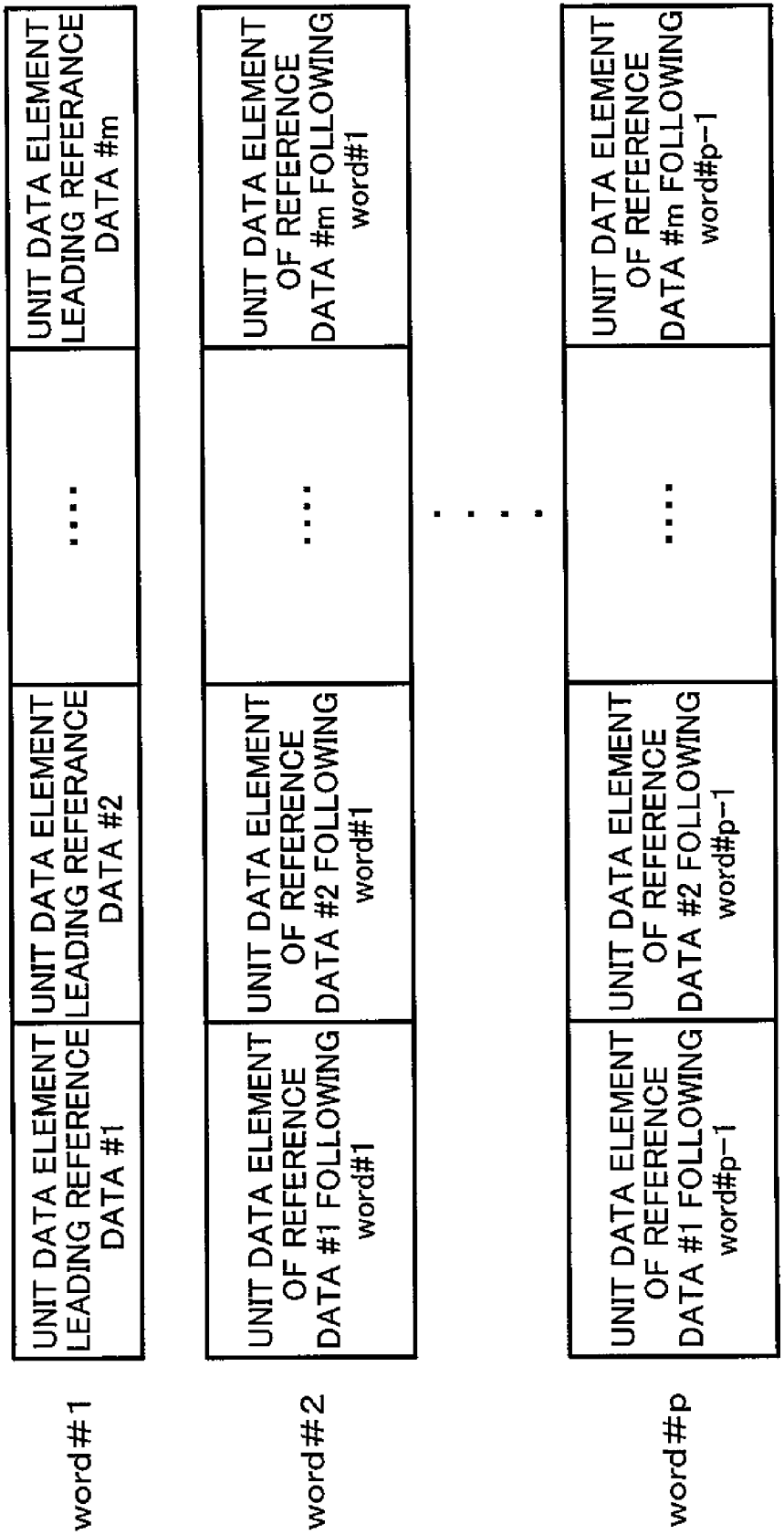
FIG. 7 is a diagram illustrating an example of an arrangement of a plurality of reference data items #1 to #m in the memory 52.

The memory 52 realizes the reference table 42a, and stores a plurality of reference data items #1 to #m, each of which is constituted by a plurality of unit data elements (words #1 to #k) as illustrated in FIGS. 6 and 7, where each of the plurality of unit data elements (words #1 to #k) has the above unit data length.

When the address control circuit 51 receives the acquisition signal, the address control circuit 51 controls the memory 52 by supplying an address signal to the memory 52 so that the plurality of reference data items #1 to #m are read in parallel from the word #1, for example, word by word, and supplied to the comparison unit 53.

In each of plurality of reference data items #1 to #m, the words #1 to #k may be arranged in increasing order of their memory addresses. However, since the manner of arrangement of the words #1 to #k in the memory 52 is related with the manner of control of the address signal supplied to the memory 52, the words #1 to #k may be arranged in the memory 52 in a different manner. In addition, the memory 52 is not limited to a normal SRAM (Static RAM) or DRAM (Dynamic RAM), and may be, for example, a FIFO (First In First Out) memory.

The comparison unit 53 corresponds to the comparison circuit 42b, and compares each unit data element acquired by the object data acquisition circuit 50 with each unit data element in each of the plurality of reference data items #1 to #m which is read from the memory 52. In the comparison unit 53, a plurality of comparators #1 to #m are arranged corresponding to the plurality of reference data items #1 to #m. Each of the plurality of comparators #1 to #m compares each unit data element of one of the plurality of reference data items #1 to #m corresponding to the comparator, with a unit data element which is acquired by the object data acquisition circuit 50 and corresponds to the unit data element of the one of the plurality of reference data items #1 to #m. Each of the plurality of comparators #1 to #m holds information indicating whether or not all portions of the object data which have been already compared with a reference data item coincide with corresponding portions of the reference data item, until the comparison of the entire object data with the reference data item is completed.

In the above example, the length of data which is compared by each comparator in one operation corresponds to the width of the packet data bus. However, the length of data which is compared by each comparator in one operation may not equal to the width of the packet data bus. When the length of data which is compared by each comparator in one operation is changed, the timing of the acquisition signal and the manner of the registration of the reference data should be changed accordingly.

In addition, it is easy to modify the plurality of comparators #1 to #m so that comparison of a portion of the object data is not made. Further, it is also easy to modify the comparison unit 53 so as to output various types of other information which relates to the coincidence with the reference data item, as well as a match signal which indicates whether or not the entire object data coincides with the reference data item. For example, the comparison unit 53 may be configured to output information indicating which reference data item coincides with corresponding object data.

FIG. 8 is a diagram illustrating examples of contents of the reference data items registered in the memory 52.

In FIG. 8, an ID identifying a reference data item is indicated in the "Entry No." field. That is, the reference data item corresponding to the "Entry No. 1" corresponds to the reference data item #1 in FIGS. 5 to 7.

The first bit in the "Valid/TCP" field indicates whether the reference data item corresponding to the ID is valid ("1") or invalid ("0"). The second bit in the "Valid/TCP" field indicates whether the reference data item corresponding to the ID is provided for TCP ("1") or UDP ("0").

In the "INT-IP" field, a private IP address of one of the personal computers 12-1 to 12-3 and 14-1 to 14-3 (which are hereinafter referred to as LAN-side personal computers) is indicated. When the router 30 receives a packet through one of the ports #1 and #2 (which are hereinafter referred to as LAN-side ports), the comparison unit 53 in the router 30 compares the source IP address of the packet with the private IP address in the "INT-IP" field.

In the "EXT-IP" field, a global IP address of one of the personal computers 17 and 18 (which are hereinafter referred to as WAN-side personal computers) is indicated. When the router 30 receives a packet through the port #3 (which is hereinafter referred to as a WAN port), the comparison unit 53 in the router 30 compares the source IP address of the packet with the global IP address in the "EXT-IP" field. When the router 30 receives a packet through the LAN-side ports #1 and #2, the comparison unit 53 in the router 30 compares the destination IP address of the packet with the global IP address in the "EXT-IP" field.

In the "NAT-IP" field, a global IP address with which a private IP address contained as a source IP address in a packet received from one of the LAN-side personal computers is to be replaced, or which is to be replaced with a private IP address of one of the LAN-side personal computers as a destination IP address in a packet to be transmitted to the one of the LAN-side personal computers, is indicated. That is, when the router 30 receives a packet through the WAN-side port #3, the comparison unit 53 in the router 30 compares the destination IP address of the packet with the global IP address in the "NAT-IP" field.

In the "INT-PORT" field, a TCP or UDP port number used by one of the LAN-side personal computers is indicated. When the router 30 receives a packet through one of the LAN-side ports #1 and #2, the comparison unit 53 in the router 30 compares a source port number contained in the packet with the TCP or UDP port number in the "INT-PORT" field.

In the "EXT-PORT" field, a TCP or UDP port number used by one of the WAN-side personal computers is indicated. When the router 30 receives a packet through the WAN-side port #3, the comparison unit 53 in the router 30 compares a source port number contained in the packet with the TCP or UDP port number in the "EXT-PORT" field. When the router 30 receives a packet through one of the LAN-side ports #1 and #2, the comparison unit 53 in the router 30 compares a destination port number contained in the packet with the TCP or UDP port number in the "EXT-PORT" field.

In the "NAT-PORT" field, a port number with which a TCP or UDP port number of one of the LAN-side personal computers contained as a source port number in a packet received from the one of the LAN-side personal computers is to be replaced, or which is to be replaced with a TCP or UDP port number of one of the LAN-side personal computers as a destination port number in a packet to be transmitted to the one of the LAN-side personal computers, is indicated. When the router 30 receives a packet through one of the WAN-side port #3, the comparison unit 53 in the router 30 compares a destination port number contained in the packet with the TCP or UDP port number in the "NAT-PORT" field.

In the "INT-MAC" field, a MAC address of one of the LAN-side personal computers is indicated.

In the "EXT-MAC" field, a MAC address of a point to which a packet addressed to one of the WAN-side personal computers is to be first transferred from the router 30 is indicated. In this example, the MAC address in the "EXT-MAC" field is the MAC address of an access point of the ISP 15.

In the "INT-Dest" field, an output port of the router 30 through which a packet addressed to one of the LAN-side personal computers is to be output is indicated.

In the "EXT-Dest" field, an output port of the router 30 through which a packet addressed to one of the WAN-side personal computers is to be output is indicated. In the configuration of FIG. 3, the output port is the port #3.

Alternatively, the output ports of the router 30, which are indicated in the fields "INT-Dest" and "EXT-Dest" in the reference table 42*a* in this example, may be referred to by using a routing table.

It is basically sufficient that the reference table 42*a* includes only the IP addresses and TCP or UDP port numbers before and after the NAT operation. In addition, in order to specify a destination on the WAN (Internet) side, the IP address and the TCP or UDP port number on the WAN (Internet) side are required.

Further, when the IP address in the "NAT-IP" field in the reference table 42*a* is made identical to the IP address in the "INT-IP" field, and the reference table 42*a* is configured so that the port numbers are ignored, the router 30 can behave as a router which does not have an NAT function. Furthermore, it is easy to configure the reference table 42*a* so that only the IP addresses are translated, and the port numbers are ignored.

Figure 9:
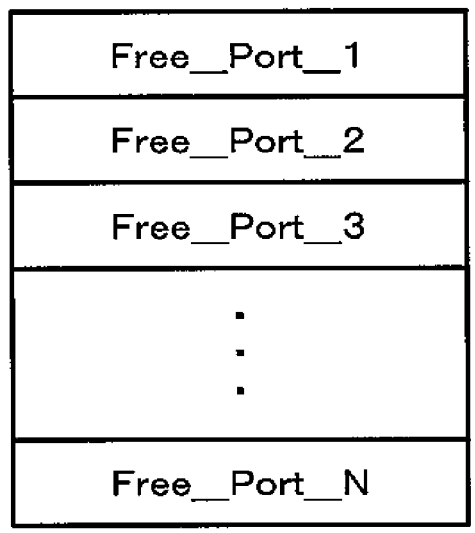
FIGS. 9(A) and 9(B) are diagrams illustrating examples of TCP port number pools which are managed by the CPU 41.
Figure 9:
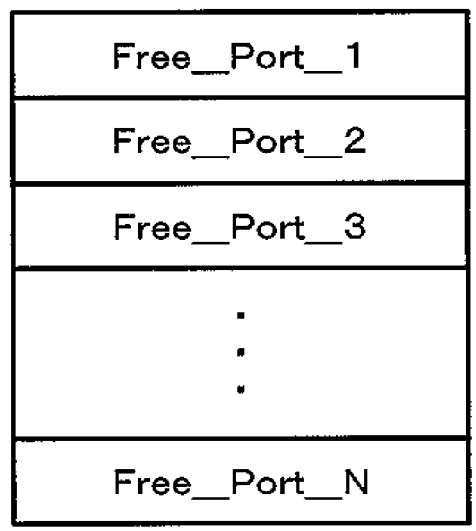

FIGS. 9(A) and 9(B) are diagrams illustrating examples of TCP port number pools which are managed by the CPU 41. The TCP port number pools are provided respectively corresponding to the global IP addresses which can be used in the NAT operation. In each of the TCP port number pools, TCP port numbers which can be used in the NAT operation are stored. That is, FIG. 9(A) shows a TCP port number pool including TCP port numbers which can be used in the NAT operation corresponding to the global IP address #1, and FIG. 9(B) shows a TCP port number pool including TCP port numbers which can be used in the NAT operation corresponding to the global IP address #2.

Further, in the case where the NAT function is used with UDP, UDP port number pools which are similar to the TCP port number pools of FIGS. 9(A) and 9(B) are produced.

Figure 10:
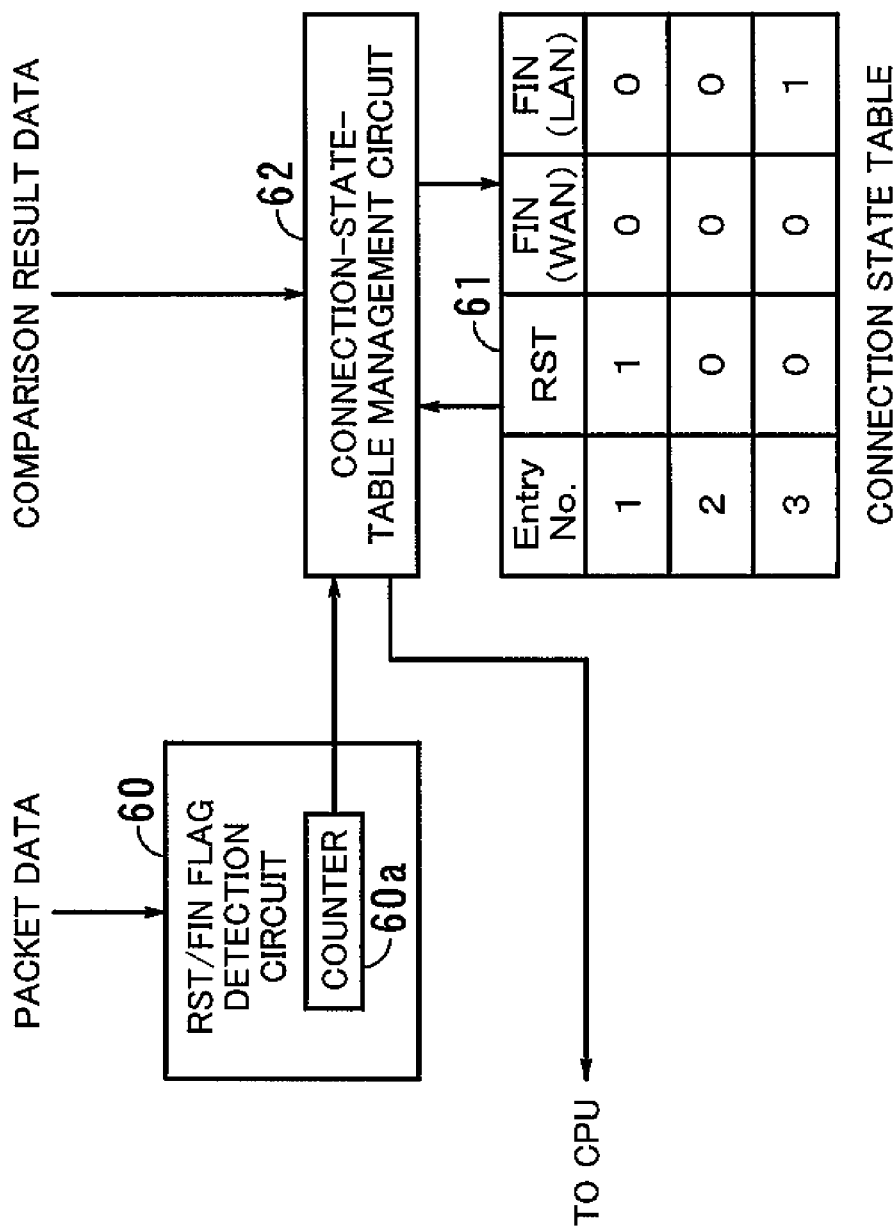
FIG. 10 is a diagram illustrating an example of a construction of the termination-of-connection detection circuit 43.

FIG. 10 is a diagram illustrating an example of a construction of the termination-of-connection detection circuit 43. The termination-of-connection detection circuit 43 of FIG. 10 comprises an RST/FIN flag detection circuit 60, a connection state table 61, and a connection-state-table management circuit 62.

The RST/FIN flag detection circuit 60 is provided for detecting an RST flag and an FIN flag, and comprises a counter 60*a* which is incremented every time a unit amount of packet data corresponding to the width of the packet data bus is input. It is possible to detect the positions of an RST flag and an FIN flag in each TCP header by reference to the counter 60*a*, and determine the values of the RST flag and the FIN flag. When the RST flag or the FIN flag is detected, the RST/FIN flag detection circuit 60 produces an RST detection signal or an FIN detection signal, which is supplied to the connection-state-table management circuit 62.

The connection state table 61 is provided for storing at least one state of at least one connection, i.e., the connection state table 61 indicates a state of a connection corresponding to each ID (which is indicated in the "Entry No." field of the reference table 42*a*). The connection state table 61 has an "RST" field, an "FIN(WAN)" field, and an FIN(LAN) field, corresponding to each value of the ID, which is indicated in an "Entry No." field of the connection state table 61. The value in the "RST" field is set to "1" by the connection-state-table management circuit 62 when the router 30 receives through a connection a packet in which an RST flag is set. The value in the "FIN(WAN)" field is set to "1" by the connection-state-table management circuit 62 when the router 30 receives a packet in which an FIN flag is set, from the WAN side through a connection. The value in the "FIN(LAN)" field is set to "1" by the connection-state-table management circuit 62 when the router 30 receives a packet in which an FIN flag is set, from the LAN side through a connection. In this case, it is necessary that each packet indicates in its descriptor whether the packet is received from the WAN side or the LAN side.

The connection-state-table management circuit 62 is provided for managing the connection state table 61. When the connection-state-table management circuit 62 receives the RST detection signal or the FIN detection signal from the RST/FIN flag detection circuit 60 and the aforementioned match signal from the comparison circuit 42b (i.e., the comparison unit 53), the connection-state-table management circuit 62 updates a state stored in the row of the connection state table 61 corresponding to an ID of the reference data item which matches with the input packet. Information on the ID of the reference data item which matches the input packet is supplied from the comparison circuit 42b. For example, when the connection-state-table management circuit 62 receives an RST detection signal from the RST/FIN flag detection circuit 60 and information that the input packet matches with the reference data item corresponding to the ID "1", the connection-state-table management circuit 62 updates the value in the "RST" field corresponding to the ID "1" in the connection state table 61 to "1".

When the router 30 receives packets in which an FIN flag is set, from both the LAN side and the WAN side through a connection, or when the router 30 receives a packet in which an RST flag is set, from either of the LAN side and the WAN side through a connection, the connection-state-table management circuit 62 detects termination of the connection, and notifies the CPU 41 of the termination of the connection, for example, by outputting a termination-of-connection detection signal to the CPU 41.

Figure 11:
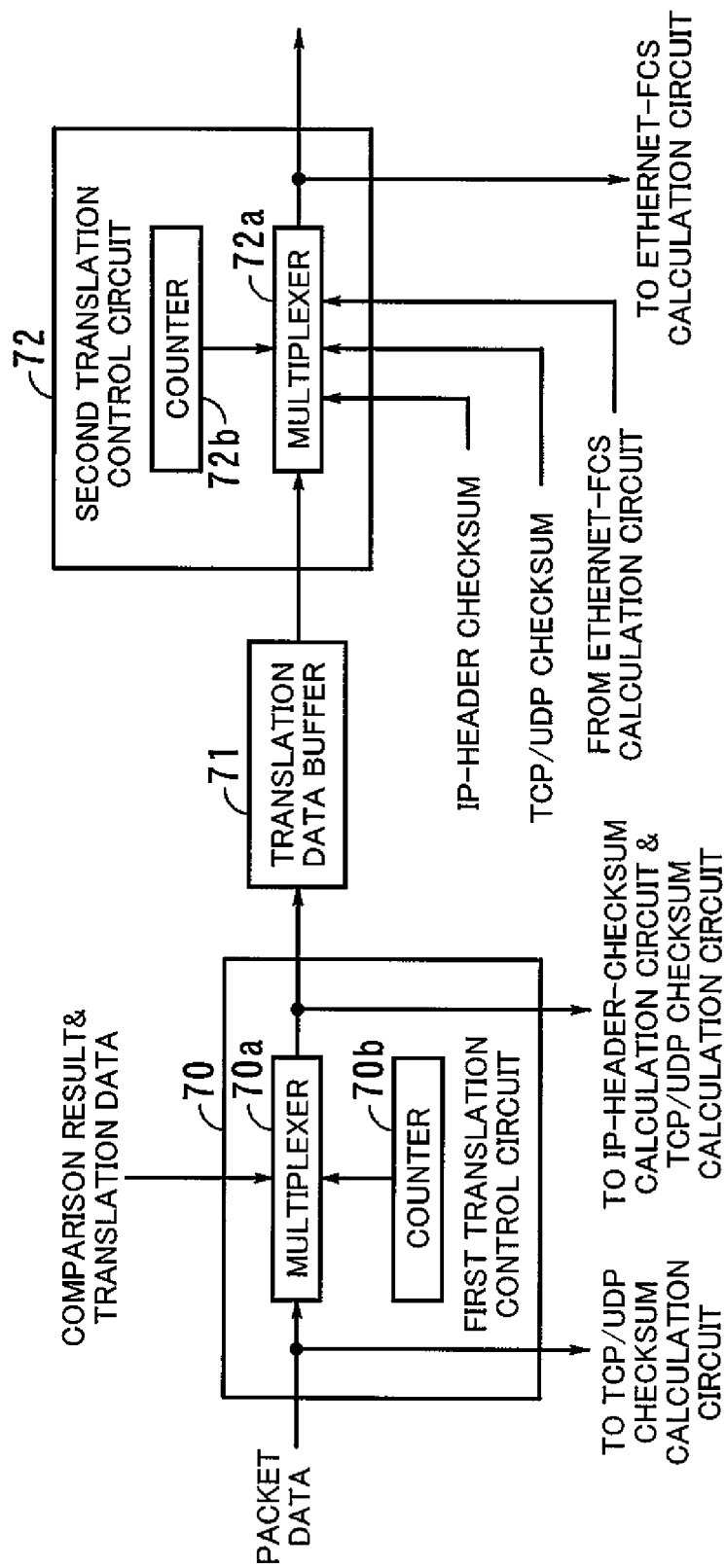
FIG. 11 is a diagram illustrating an example of a construction of the translation circuit 44.

FIG. 11 is a diagram illustrating an example of a construction of the translation circuit 44. The translation circuit 44 of FIG. 11 comprises a first translation control circuit 70, a translation data buffer 71, and a second translation control circuit 72.

The first translation control circuit 70 is provided for replacement of MAC addresses and an IP address, reduction of the value in the TTL field, and replacement of a TCP or UDP port number. The translation data buffer 71 temporarily stores packet data after translation by the first translation control circuit 70 is completed. The second translation control circuit 72 is provided for updating the values in the checksum fields in the IP header and the TCP or UDP header and the FCS field in the Ethernet frame.

The first translation control circuit 70 comprises a multiplexer 70a and a counter 70b. The counter 70b is incremented every time a unit amount of packet data corresponding to the width of an internal bus is input. The timings of the replacement of MAC addresses and an IP address, reduction of the value in the TTL field, and replacement of a TCP or UDP port number can be determined based on the count value of the counter 70b. Thus, the replacement of MAC addresses and an IP address, reduction of the value in the TTL field, and replacement of a TCP or UDP port number are made in the multiplexer 70a at the timings determined by the count value of the counter 70b. Then, the translated packet data are supplied to the IP-header-checksum calculation circuit 45 and the TCP/UDP-checksum calculation circuit 46 as well as the translation data buffer 71.

The packet data before the above translation are also supplied to the TCP/UDP-checksum calculation circuit 46 so that the IP-header-checksum calculation circuit 45 can calculate a TCP or UDP checksum in a short time by using a difference between the packet data before and after the translation. If the TCP or UDP checksum is calculated by using only the translated packet data, data of the entire TCP or UDP packet is necessary for the calculation. However, when the TCP or UDP checksum is calculated by using the difference between the packet data before and after the translation, a new value of the TCP or UDP checksum can be obtained by calculation of only the port numbers in the TCP or UDP header. Therefore, when the difference between the packet data before and after the translation is used for calculation of the TCP or UDP checksum, it is possible to reduce the size of the translation data buffer 71.

The translated packet data are temporarily stored in the translation data buffer 71. Since the checksum field precedes the IP address fields in the IP header, it is necessary to temporarily buffer the IP address fields in order to update the value in the IP checksum field.

The second translation control circuit 72 comprises a multiplexer 72a and a counter 72b. The counter 72b is incremented every time a unit amount of packet data corresponding to the width of the internal bus is input. In addition, when the counter 72b is controlled based on the contents of the packet data as well as an input of each unit amount of packet data, it is possible to flexibly cope with addition of an option to the IP header.

In the multiplexer 72a, the values in the checksum fields in the IP header and the TCP or UDP header are updated at the timing determined based on the count value of the counter 72b. After the translation of the checksum fields in the IP header and the TCP or UDP header, the packet data is transferred to the Ethernet-FCS calculation circuit 47, which calculates the value of the FCS and returns the calculated value of the FCS to the multiplexer 72a. Thus, the calculated value of the FCS is inserted in the end of the translated packet data.

Figure 12:
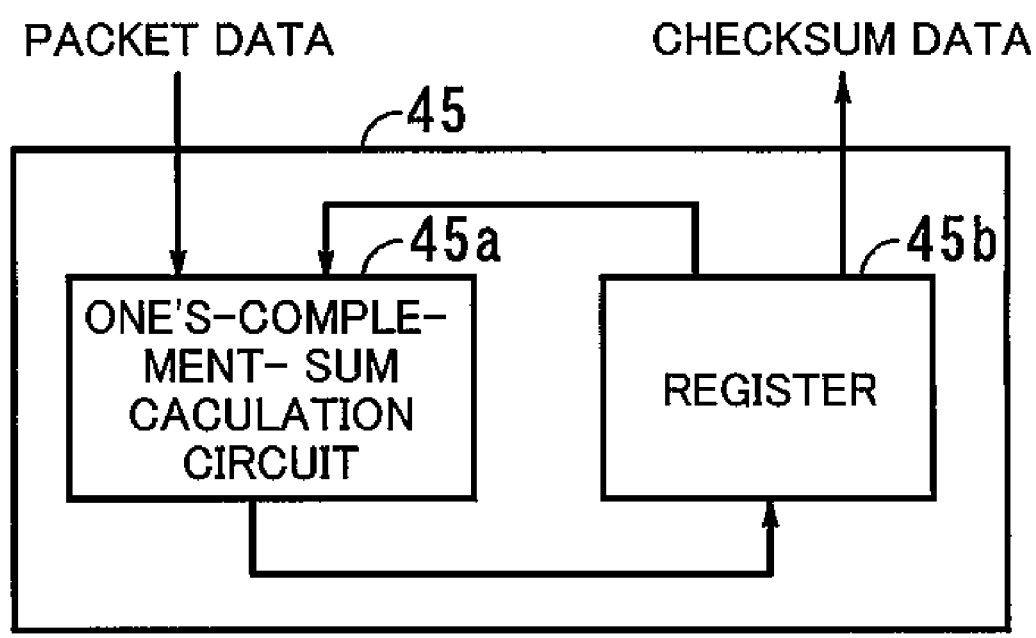
FIG. 12 is a diagram illustrating an example of a construction of the IP-header-checksum calculation circuit 45.

FIG. 12 is a diagram illustrating an example of a construction of the IP-header-checksum calculation circuit 45. The IP-header-checksum calculation circuit 45 of FIG. 12 comprises a one's-complement-sum calculation circuit 45a and a register 45b.

The one's-complement-sum calculation circuit 45a calculates a one's complement sum of the IP header by using the register 45b, and supplies the calculated one's complement sum to the register 45b. The register 45b temporarily stores data for use in the calculation of the one's complement sum, and stores and outputs the output of the one's-complement-sum calculation circuit 45a.

Figure 13:
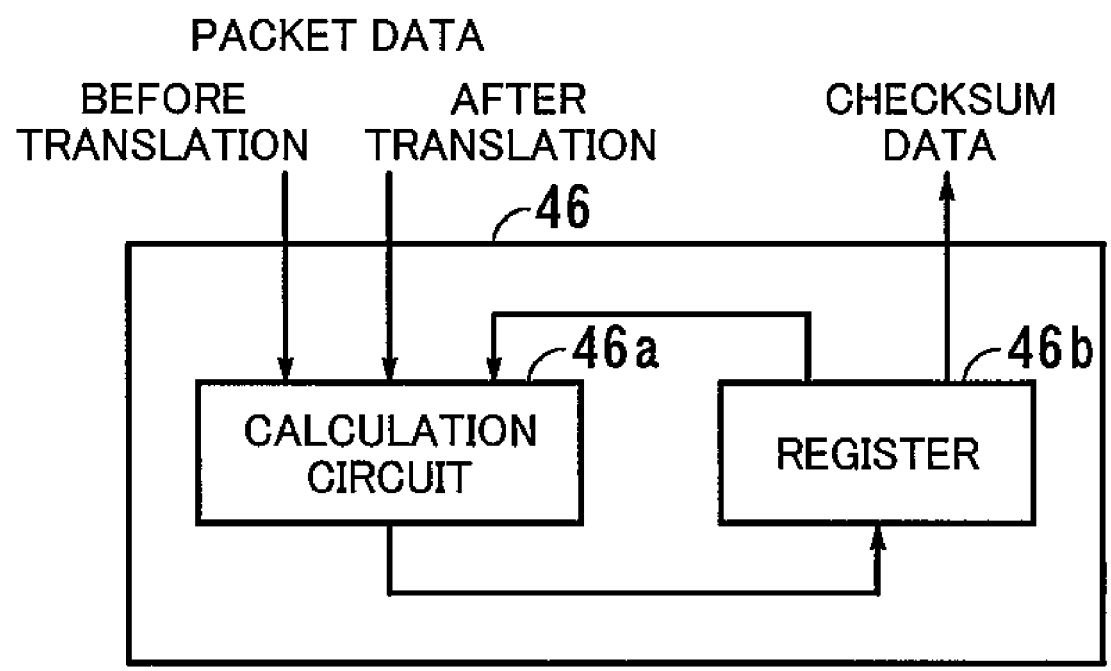
FIG. 13 is a diagram illustrating an example of a construction of the TCP/UDP-checksum calculation circuit 46.

FIG. 13 is a diagram illustrating an example of a construction of the TCP/UDP-checksum calculation circuit 46. The TCP/UDP-checksum calculation circuit 46 of FIG. 13 comprises a calculation circuit 46a and a register 46b. The calculation circuit 46a calculates a new value of the TCP or UDP checksum based on the packet data before and after the translation by using the register 46b, and supplies the calculated value to the register 46b. The register 45b temporarily stores data for use in the calculation of the TCP or UDP checksum, and stores and outputs the output of the calculation circuit 46a.

Figure 14:
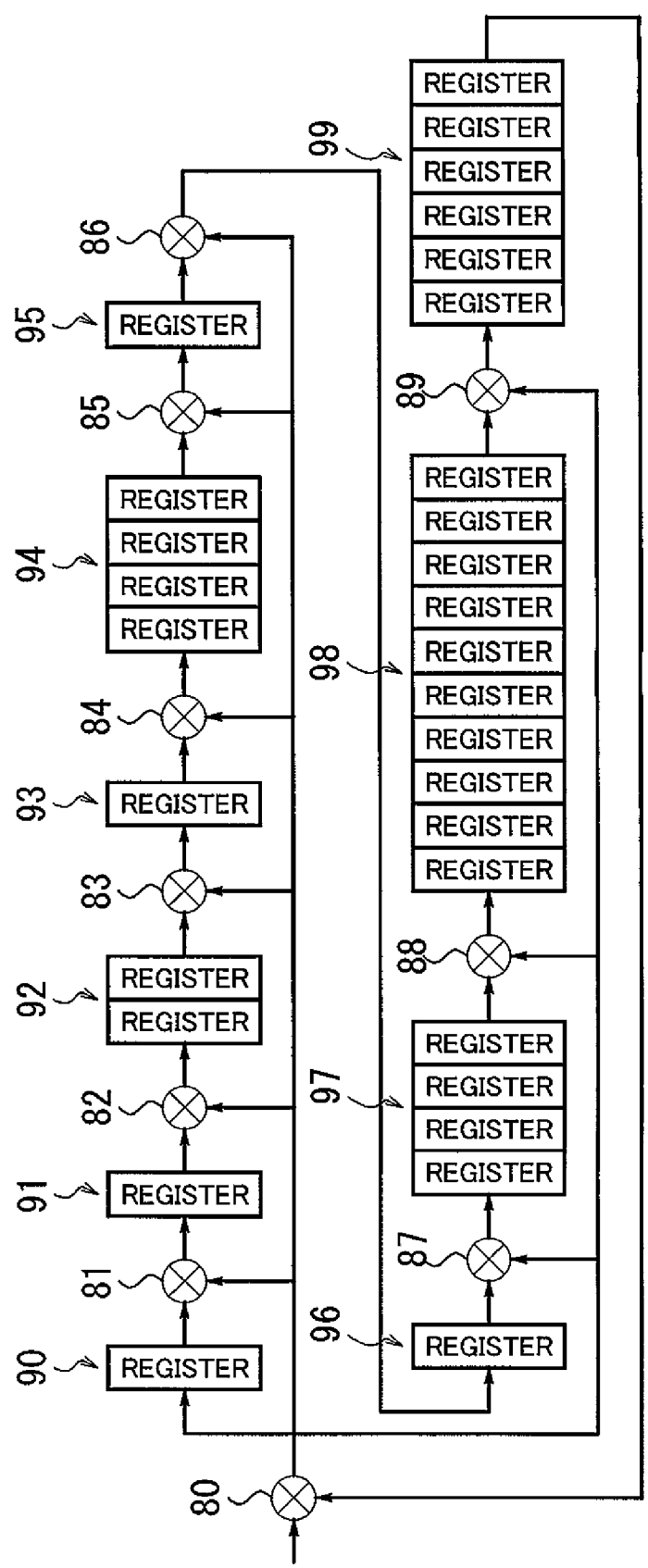
FIG. 14 is a diagram illustrating an example of a construction of the Ethernet-FCS calculation circuit 47.

FIG. 14 is a diagram illustrating an example of a construction of the Ethernet-FCS calculation circuit 47. The Ethernet-FCS calculation circuit 47 of FIG. 14 comprises XOR circuits 80 to 89 and registers or groups of registers 90 to 99, and calculates a CRC (Cyclic Redundancy Check) value as a new value in the FCS field of the Ethernet frame.

(3) Operation of Embodiment

The operations of the embodiment of the present invention having the above construction are explained below. The explanation is provided for the case where the personal computer 12-1 communicates with the personal computer 17 by using TCP.

First, the personal computer 12-1 transmits a packet which is addressed to the personal computer 17 and in which an SYN flag is set.

The router 30 receives the packet transmitted from the personal computer 12-1, and the CPU 41 recognizes a start of a connection, and assigns a global IP address (e.g., "NATIP.1.A") and a TCP port number (e.g., "NATPT.1.A") to the personal computer 12-1 for the connection. Then, the CPU 41 registers in the reference table 42a an IP address "IP.1.A" of the personal computer 12-1, an IP address "IP.G.A" of the personal computer 17, the above global IP address "NATIP.1.A" assigned to the personal computer 12-1, a TCP port number "PT.1.A" used by the personal computer 12-1, a TCP port number "PT.G.A" used by the personal computer 17, the above TCP port number "NATPT.1.A" assigned to the personal computer 12-1, a MAC address "MAC.1.A" of the personal computer 12-1, and a MAC address "MAC.AP" of the WAN-side access point. In addition, the CPU 41 registers a LAN-side output port "port #1" in the "INT-Dest" field and a WAN-side output port "WAN port" in the "EXT-Dest" field, in the reference table 42a. These data correspond to the data corresponding to the "Entry No. 1" in the example of the reference table 42a illustrated in FIG. 8. The operations of the above registration may be performed by hardware.

After the above registration, when a packet having a source IP address "IP.1.A", a destination IP address "IP.G.A", a protocol "TCP", a source TCP port number "PT.1.A", a destination TCP port number "PT.G.A", a source MAC address "MAC.1.A", and a destination MAC address "MAC.router" is input into the router 30 through the port #1, the object data acquisition circuit 50 acquires necessary object data, and supplies the acquired object data to the address control circuit 51 and the comparison unit 53.

The address control circuit 51 generates an address signal based on the object data supplied from the object data acquisition circuit 50, and supplies the address signal to the memory 52, so that the reference data items #1 to #m are read in parallel in accordance with the address signal, and are respectively supplied to the comparators #1 to #m in the comparison unit 53.

The comparators #1 to #m compare the object data supplied from the object data acquisition circuit 50 with the reference data items #1 to #m on a word-to-word basis. When all of the words constituting the object data matches with one of the reference data items #1 to #m, one of the comparators #1 to #m corresponding to the one of the reference data items #1 to #m outputs a match signal.

In this example, the source IP address "IP.1.A", a destination IP address "IP.G.A", the protocol "TCP", the source TCP port number "PT.1.A", the destination TCP port number "PT.G.A", the source MAC address "MAC.1.A", and the destination MAC address "MAC.router" of the above packet, which is input into the router 30 through the port #1, match with the contents in the corresponding fields in the reference data item of the "Entry No. 1" (e.g., the reference data item #1). Therefore, the comparator #1 outputs the match signal and accompanying information including the global IP address "NATIP.1.A", the translated TCP port number "NATPT.1.A", the MAC address "MAC.router" of the router 30, and the MAC address "MAC.AP" of the WAN-side access point.

When the multiplexer 70a receives the above match signal and the accompanying information, the multiplexer 70a refers to the count value of the counter 70b, reduces the value in the TTL field, and replaces the source IP address, the source port number, the source MAC address, and the destination MAC address of the received packet with the corresponding contents of the accompanying information so that the packet is translated into a packet having a source IP address "NATIP.1.A", a destination IP address "IP.G.A", a protocol "TCP", a source TCP port number "NATPT.1.A", a destination TCP port number "PT.G.A", a source MAC address "MAC.router", and a destination MAC address "MAC.AP".

The packet translated as above is temporarily stored in the translation data buffer 71, and is then supplied to the second translation control circuit 72.

The second translation control circuit 72 inserts a value of the IP header checksum calculated by the IP-header-checksum calculation circuit 45, a value of the TCP or UDP header checksum calculated by the TCP/UDP-checksum calculation circuit 46, and a value of the FCS field in the respectively predetermined positions of the packet. Thus, the translation of the packet is completed.

Then, the packet translated as above is output through the port #3, and sent to the personal computer 17 through the ISP 15 and the Internet 16.

When the personal computer 17 receives the above packet, the personal computer 17 performs processing in response to a request contained in the received packet so as to obtain requested data, produces a packet containing the requested data and a header including a source IP address "IP.G.A", a destination IP address "NATIP.1.A", a protocol "TCP", a source TCP port number "PT.G.A", a destination TCP port number "NATPT.1.A", a source MAC address "MAC.AP", and a destination MAC address "MAC. router", and outputs the produced packet to the router 30 through ISP 15. "MAC.AP" represents the MAC address of the PC 17 and "MAC. router" represents the MAC address of the router connected to the PC 17.

The packet transmitted from the personal computer 17 is input into the router 30 through the port #3, and is then passed to the comparison circuit 42b. As in the case of the packet received from the personal computer 12-1, when all of words constituting object data obtained from the packet received from the personal computer 17 match with the contents of the corresponding fields of one of the reference data items #1 to #m, a match signal and accompanying information are supplied to the translation circuit 44.

Then, the translation circuit 44 reduces the value in the TTL field, and replaces the destination IP address, the source port number, the source MAC address, and the destination MAC address of the received packet with the corresponding contents of the accompanying information so that the packet is translated into a packet having a source IP address "IP.G.A", a destination IP address "IP.1.A", a protocol "TCP", a source TCP port number "PT.G.A", a destination TCP port number "PT.1.A", a source MAC address "MAC-.router", and a destination MAC address "MAC.1.A". In addition, the value of the IP header checksum calculated by the IP-header-checksum calculation circuit 45, the value of the TCP or UDP header checksum, and the value of the FCS field are respectively replaced with recalculated values, and then the packet is output through the port #1, so that the packet is sent to the personal computer 12-1 through the hub 11.

Thus, packets can be exchanged between the personal computer 12-1 and the personal computer 17.

In order to terminate the above communication in the above connection, a packet in which an RST or FIN flag is set is transmitted. In this case, the RST/FIN flag detection circuit 60 in the router 30 detects the RST or FIN flag. At this time, the comparison circuit 42b outputs a match signal, and the connection-state-table management circuit 62 updates the value in the "RST" field or "FIN" field corresponding to the "Entry No.1" in the connection state table 61 to "1"

When the router 30 receives packets in which an FIN flag is set, from both the LAN side and the WAN side through a connection, or when the router 30 receives a packet in which an RST flag is set, from either of the LAN side and the WAN side through a connection, the connection-state-table management circuit 62 detects termination of the connection, and notifies the CPU 41 of the termination of the connection.

When the CPU 41 is notified of the termination of the connection, the CPU 41 makes the first bit in the "Valid/TCP" field corresponding to the "Entry No.1" in the reference table 42a "0" so that the contents in the row corresponding to the "Entry No.1" in the reference table 42a becomes invalid. Alternatively, the operation of making the contents in the row corresponding to the "Entry No.1" invalid may be performed by hardware.

Thus, communication between the personal computer 12-1 and the personal computer 17 can be terminated.

Next, an example of a sequence of operations performed in the router 30 for starting communication through a connection is explained below with reference to FIG. 15.

In step S30, the CPU 41 determines whether or not the router 30 receives from the LAN side a packet which requests a start of communication in a new connection, i.e., whether or not the router 30 receives from the LAN side a TCP packet in which the SYN flag is set and the ACK flag is not set. When yes is determined in step S30, the operation goes to step S31. When no is determined in step S30, the sequence of FIG. 15 is completed.

In step S31, the CPU 41 determines whether or not an available port number exists. When yes is determined in step S31, the operation goes to step S32. When no is determined in step S31, the sequence of FIG. 15 is completed.

In step S32, the CPU 41 obtains a port number from the TCP port number pool. In practice, the CPU 41 obtains a combination of a TCP port number and an IP address.

In step S33, the CPU 41 determines whether or not an available space exists in the reference table 42a. When yes is determined in step S33, the operation goes to step S34. When no is determined in step S33, the sequence of FIG. 15 is completed. Alternatively, when no available space exists in the reference table 42a, the NAT operation may be performed by software.

Figure 15:
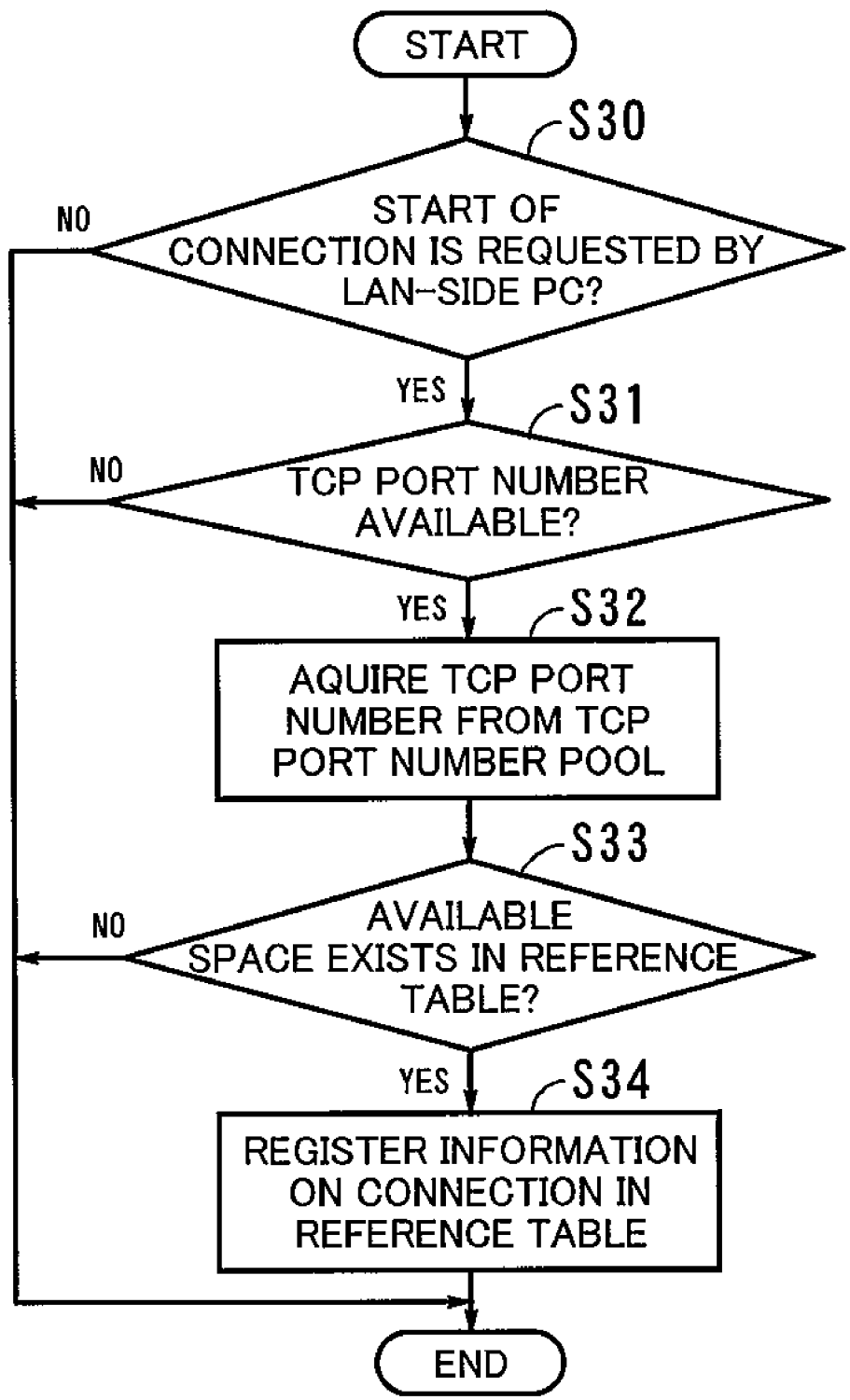
FIG. 15 is a flow diagram illustrating an example of a sequence of operations performed in the router 30 for starting communication through a connection.

In step S34, the CPU 41 registers information on the connection in the reference table 42a, and the sequence of FIG. 15 is completed. Thus, the router 30 becomes ready to handle packets in the connection which the router 30 receives subsequently to the above packet which requests the start of communication.

In addition, an example of a sequence of operations performed in the router 30 for terminating communication through a connection is explained below with reference to FIG. 16.

In step S40, the CPU 41 receives a termination-of-connection detection signal for a connection.

In step S41, the CPU 41 determines which connection is terminated, based on the information registered in the connection state table 61.

In step S42, the CPU 41 invalidates information on the connection in the reference table 42a, i.e., makes the first bit of the "Valid/TCP" field corresponding to the connection in the reference table 42a "0".

Figure 16:
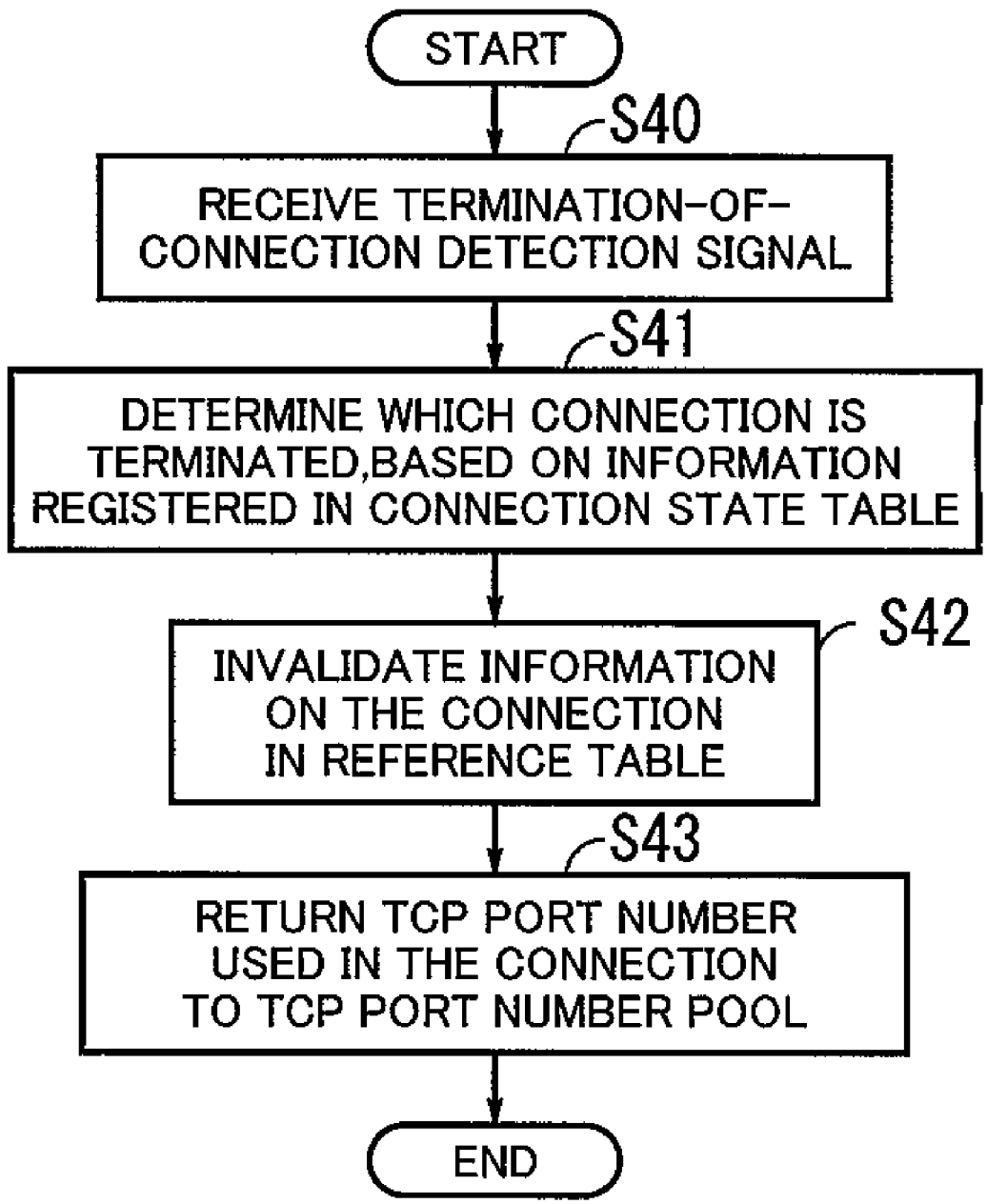
FIG. 16 is a flow diagram illustrating an example of a sequence of operations performed in the router 30 for terminating communication through a connection.

In step S43, the CPU 41 returns a TCP port number which has been used in the connection, to the TCP port number pool, and then the sequence of FIG. 16 is completed. Thus, the communication through the connection is terminated.

(4) Advantages of Present Invention

The advantages of the present invention are explained below.

(i) First, the operations of referring to the reference table 42a are considered below.

In the conventional packet transfer apparatus having an NAT function, a reading operation and a comparing operation are necessary for referring to a unit data element in a reference table by software. When it is assumed that four cycles are needed for performing one reading operation, and one cycle is needed for performing one comparing operation, it takes five cycles to refer to a unit data element in the reference table by software. Therefore, it takes 5×n cycles to refer to n unit data elements in the reference table. In addition, in practice, it is necessary to refer to a plurality of fields in the reference table. For example, at least, a destination IP address, a source IP address, a destination port number, and a source port number are necessarily referred to. Thus, the number of cycles needed for referring to the reference table is increased by a factor of at least four.

On the other hand, in the packet transfer apparatus as the embodiment of the present invention, it is possible to refer to n reference data items in the reference table in parallel. Therefore, every n unit data elements in the n reference data items can be referred to in parallel in one cycle. That is, the processing speed is independent of the number of the reference data items with which the object data is compared.

If a CAM (Content Addressable Memory) is used, the time needed for referring to a reference table can be reduced. However, the CAM is expensive, and it is not realistic to use the CAM in normal packet transfer apparatuses.

Further, In the conventional packet transfer apparatus, the operations for referring to the reference table are performed by software, and therefore the operations for referring to the reference table for each packet are required to be performed in a predetermined protocol processing stage after completion of reception of the packet. Thus, processing time is further increased, and completion of the operations for referring to the reference table is delayed.

On the other hand, in the packet transfer apparatus as the embodiment of the present invention, the operations for referring to the reference table are performed by, a dedicated hardware circuit while performing operations for receiving packets. That is, the operations for referring to the reference table are completed substantially at the same time as the completion of the operations for receiving packets.

(ii) Secondly, the operations for calculating a checksum are considered below.

For example, when it is assumed that four bytes are read in one cycle, it takes 5×4=20 cycles to read an IP header having a length of 20 bytes. In addition, the calculation of a checksum is made in two bytes. Therefore, when carryover occurs, it is necessary to perform carryover processing for addition of a carry bit. Thus, in order to calculate a checksum of an IP header having a length of 20 bytes, ten (=20/2)

addition operations and ten carryover processing operations accompanying the addition operations are required to be performed. When it is assumed that each of the addition operations and the carryover processing operations is performed in one cycle, it takes twenty cycles to perform the addition operations and the carryover processing operations for calculating a checksum. Consequently, it takes at least 40 (=20+20) cycles in total to perform the operations for reading an IP header and calculating a checksum of the IP header. In practice, the above operations are performed in a predetermined protocol processing stage after the operations for receiving a packet including the IP header is completed. Therefore, processing time is further increased, and completion of the operations for calculating a checksum of the IP header is delayed.

On the other hand, in the packet transfer apparatus as the embodiment of the present invention, the NAT operations and the calculation of checksums are performed by a dedicated hardware circuit while performing operations for receiving packets. Therefore, the calculation of checksums is completed when the IP header passes through the translation circuit 44. That is, all of the operations are completed in one cycle.

(iii) Thirdly, the throughput of the NAT processing is considered below.

For example, a measured transfer rate of a packet which undergoes NAT processing by software in a conventional packet transfer apparatus which includes MIPS R7000 (64 bits) as a CPU, and in which NetBSD operates as an OS at an operating frequency of 125 MHz is about 9 Mbps, where each of MIPS and R7000 is a trademark or registered trademark of MIPS Technologies, Inc., and NetBSD is a registered trademark of the NetBSD Foundation. Therefore, the conventional packet transfer apparatus cannot be used for 100 Mbps FTTH, which realizes the highest transfer rate currently available.

The processing speed of the above CPU, MIPS R7000, is much higher than the CPUs used in the current home network products. Although some home network product is currently sold with an advertising statement that the maximum transfer rate is 40 MHz, this performance will be achieved only when very long packets which contain very long non-header portions (e.g., 1,500 bytes) are successively processed. When short packets (e.g., 64 bytes) are successively processed in such a home network product, the effective reference rate will be lower than 5 Mbps.

On the other hand, in the packet transfer apparatus as the embodiment of the present invention, the maximum bit rate is determined by the product of the width of the internal data bus and the operating frequency, and is not affected by the packet length. This is because the header data can be referred to and translated and checksums can be calculated for transmission, by respectively dedicated hardware circuits, while performing processing for receiving a packet.

For example, when the width of the internal data bus is 4 bits, and the operating frequency is 25 MHz, the packet transfer apparatus as the embodiment of the present invention can handle the packets transmitted by 100 Mbps FTTH, regardless of the type of CPU. When the operating frequency is increased to 125 MHz, it is possible to achieve a transfer rate of 500 Mbps, which is more than 50 times the transfer rate of the conventional packet transfer apparatus. Conversely, in order to achieve the same throughput (the transfer rate of 100 MHz) as the packet transfer apparatus as the embodiment of the present invention which has the width of the internal data bus of 4 bits and operates at the operating frequency of 25 MHz, the operating frequency of the conventional packet transfer apparatus which includes MIPS R7000 (64 bits) must be increased to 1.4 GHz. This value is calculated based on the number of cycles which are needed for performing the NAT operation by software in the above conventional packet transfer apparatus. However, currently, MIPS R7000 cannot operate at an operating frequency as high as 1.4 GHz.

Further, since the NAT operation in the conventional packet transfer apparatus is performed by software in a predetermined protocol processing stage after the operations for receiving a packet including the IP header is completed. Therefore, processing time is further increased, and completion of the NAT operation is delayed. On the other hand, since the NAT operation in the packet transfer apparatus as the embodiment of the present invention is performed by a dedicated hardware circuit while performing operations for receiving packets, completion of the NAT operation is not delayed.

(5) Other Matters (i) Although, in the configuration illustrated in FIG. 2, the router 30 has one port on the WAN side and two ports on the LAN side, the number of port or ports on each side of the router 30 is not limited to the illustrated number. In addition, the number of personal computers arranged on each side of the router 30 is not limited to the illustrated number.

(ii) Although, in the embodiment explained above, it is assumed that the private IP addresses are assigned to the LAN-side personal computers, global IP addresses, instead of the private IP addresses, may be assigned to the LAN-side personal computers.

(iii) It is possible to form an integrated circuit in a semiconductor device so that the integrated circuit realizes the circuits constituting the packet transfer apparatus as the embodiment of the present invention. When such a semiconductor device is used, the packet transfer apparatus as the embodiment of the present invention can be produced at low price.

(iv) The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

(v) All of the contents of the Japanese patent application, No. 2001-320745 are incorporated into this specification by reference.

What is claimed is:

1. A packet transfer apparatus for transferring packets between first and second networks, comprising:

an address assignment circuit which assigns a translated network address to a first node belonging to said first network and having a first network address when said packet transfer apparatus transfers a first packet from the first node to a second node belonging to said second network and having a second network address through a connection;

an address management circuit which stores for said connection said translated network address, associated with said first and second network addresses; and an address translation circuit which is realized by a dedicated hardware circuit, and translates said first network address contained in a second packet into said translated network address by reference to said address management circuit when said packet transfer apparatus transfers the second packet from said first node to said second node through said connection, and translates said translated network address contained in a third packet into the first network address by reference to said address management circuit when said packet transfer apparatus transfers the third packet from said second node to said first node through said connection, wherein said address management circuit stores at least one reference information item on at least one connection, and each of the at least one reference information item includes a combination of a network address of a node belonging to the first network, a network address of a node belonging to the second network, and a translated network address, said address translation circuit reads in parallel said at least one reference information item from said address management circuit, compares a first predetermined portion of a fourth packet with the at least one reference information item in parallel in order to search for one of the at least one reference information item which matches with the first predetermined portion of the fourth packet, and translates a third network address of a third node belonging to said first network, contained in the fourth packet, into the translated network address included in said one of the at least one reference information item when said fourth packet is transferred from said first network to said second network, or translates a translated network address contained in the fourth packet into the network address of the node belonging to the first network, included in the one of the at least one reference information item, when said fourth packet is transferred from said second network to said first network.

2. The packet transfer apparatus according to claim 1, wherein said address translation circuit separately stores a combination of said translated network address and said first and second network addresses for each port number defined in said second network so that an identical translated network address can be assigned to more than one node in said first network.

3. The packet transfer apparatus according to claim 1, further comprising a start-of-communication detection circuit which detects a start of communication through a connection, and when said start-of-communication detection circuit detects a start of communication through a connection, information on said connection is registered in said address management circuit.

4. The packet transfer apparatus according to claim 1, further comprising a termination-of-communication detection circuit which detects termination of communication through a connection, and when said termination-of-communication detection circuit detects termination of communication through a connection, information on said connection registered in said address management circuit is deleted.

5. The packet transfer apparatus according to claim 1, wherein said address translation circuit comprises a multiplexer and a counter, and said address translation circuit translates said first network address into said translated network address, and said translated network address into the first network address, in the multiplexer by reference to a count value of the counter.

6. The packet transfer apparatus according to claim 1, further comprising a checksum calculation circuit which calculates at least one checksum of each of said second and third packets after said address translation circuit translates said first network address into said translated network address or said translated network address into the first network address.

7. The packet transfer apparatus according to claim 6, wherein said checksum calculation circuit comprises a multiplexer and a counter, and said checksum calculation circuit inserts said at least one checksum in at least one appropriate portion of each packet by using the multiplexer by reference to a count value of the counter.

8. The packet transfer apparatus according to claim 6, wherein said at least one checksum includes a TCP or UDP checksum, and said checksum calculation circuit calculates the TCP or UDP checksum by using data of each packet before and after translation by said address translation circuit.

9. The packet transfer apparatus according to claim 1, further comprising a software processing unit which realizes an NAT function by software when said address management circuit has no space for storing said translated network address.

10. A communication system comprising:
a first network;
a second network; and
a packet transfer apparatus for transferring packets between first and second networks;
said packet transfer apparatus comprises,
an address assignment circuit which assigns a translated network address to a first node belonging to said first network and having a first network address when said packet transfer apparatus transfers a first packet from the first node to a second node belonging to said second network and having a second network address through a connection,
an address management circuit which stores for said connection said translated network address, associated with said first and second network addresses, and
an address translation circuit which is realized by a dedicated hardware circuit, and translates said first network address contained in a second packet into said translated network address by reference to said address management circuit when said packet transfer apparatus transfers the second packet from said first node to said second node through said connection, and translates said translated network address contained in a third packet into the first network address by reference to said address management circuit when said packet transfer apparatus transfers the third packet from said second node to said first node through said connection,
wherein said address management circuit stores at least one reference information item on at least one connection, and each of the at least one reference information item includes a combination of a network address of a node belonging to the first network, a network address of a node belonging to the second network, and a translated network address,
said address translation circuit reads in parallel said at least one reference information item from said address management circuit, compares a first predetermined portion of a fourth packet with the at least one reference information item in parallel in order to search for one of the at least one reference information item which matches with the first predetermined portion of the fourth packet, and translates a third network address of a third node belonging to said first network, contained in the fourth packet, into the translated network address included in said one of the at least one reference information item when said fourth packet is transferred from said first network to said second network, or translates a translated network address contained in the fourth packet into the network address of the node belonging to the first network, included in the one of the at least one reference information item, when said fourth packet is transferred from said second network to said first network.

11. A semiconductor device for use in a packet transfer apparatus which transfers packets between first and second networks, comprising:
   an address assignment circuit which assigns a translated network address to a first node belonging to said first network and having a first network address when said packet transfer apparatus transfers a first packet from the first node to a second node belonging to said second network and having a second network address through a connection;
   an address management circuit which stores for said connection said translated network address, associated with said first and second network addresses; and
   an address translation circuit which is realized by a dedicated hardware circuit, and translates said first network address contained in a second packet into said translated network address by reference to said address management circuit when said packet transfer apparatus transfers the second packet from said first node to said second node through said connection, and translates said translated network address contained in a third packet into the first network address by reference to said address management circuit when said packet transfer apparatus transfers the third packet from said second node to said first node through said connection,
   wherein said address management circuit stores at least one reference information item on at least one connection, and each of the at least one reference information item includes a combination of a network address of a node belonging to the first network, a network address of a node belonging to the second network, and a translated network address,
   said address translation circuit reads in parallel said at least one reference information item from said address management circuit, compares a first predetermined portion of a fourth packet with the at least one reference information item in parallel in order to search for one of the at least one reference information item which matches with the first predetermined portion of the fourth packet, and translates a third network address of a third node belonging to said first network, contained in the fourth packet, into the translated network address included in said one of the at least one reference information item when said fourth packet is transferred from said first network to said second network, or translates a translated network address contained in the fourth packet into the network address of the node belonging to the first network, included in the one of the at least one reference information item, when said fourth packet is transferred from said second network to said first network.

12. A method for transferring packets between a first network including first nodes and a second network including second nodes, where first network addresses usable in the first network are assigned to the first nodes, and second network addresses usable in the second network are assigned to the second nodes, said method comprising the steps of:
   (a) assigning to one or more of the first nodes one ore more translated network addresses usable in the second network, when one or more packets are transferred from the one or more of the first nodes and to one or more of the second nodes;
   (b) storing, in an address management circuit, said one or more translated network addresses respectively associated with one or more of the first network addresses assigned to said one or more of the first nodes and one or more of the second network addresses assigned to said one or more of the second nodes so as to form one or more reference information sets each including one of the one or more translated network addresses, one of the one or more of the first network addresses, and one of the one or more of the second network addresses which are associated with each other;
   (c) performing a first operation by a dedicated hardware circuit when a first packet containing a first one of said first network addresses and a first one of said second network addresses is transferred from a first one of said first nodes to a first one of said second nodes, where the first operation includes the substeps of,
      (c1) reading in parallel said one or more reference information sets from said address management circuit,
      (c2) comparing a predetermined portion of said first packet with said one or more reference information sets in parallel in order to search for a first one of the one or more reference information sets which matches with the predetermined portion of the first packet, and
      (c3) translating said first one of said first network addresses into a first one of said one or more translated network addresses included in said first one of the one or more reference information sets; and
   (d) performing a second operation by a dedicated hardware circuit when a second packet containing a second one of said second network addresses and a translated network address is transferred from a second one of said second nodes to a second one of said first nodes, where the second operation includes the subsets of,
      (d1) reading in parallel said one or more reference information sets from said address management circuit,
      (d2) comparing a predetermined portion of said second packet with said one or more reference information sets in parallel in order to search for a second one of the one or more reference information sets which matches with the predetermined portion of the second packet; and
      (d3) translating said translated network address contained in said second packet into a second one of said one or more first network addresses included in said second one of the one or more reference information sets.

* * * * *

UNITED STATES PATENT AND TRADEMARK OFFICE
CERTIFICATE OF CORRECTION

PATENT NO. : 7,197,035 B2 Page 1 of 1
APPLICATION NO. : 10/102796
DATED : March 27, 2007
INVENTOR(S) : Kazuya Asano It is certified that error appears in the above-identified patent and that said Letters Patent is hereby corrected as shown below:

Column 28, line 5, change "one ore" to --one or--.

Signed and Sealed this

Seventeenth Day of July, 2007

JON W. DUDAS
*Director of the United States Patent and Trademark Office*